United States Patent
Tanaka et al.

(10) Patent No.: US 11,102,373 B2
(45) Date of Patent: Aug. 24, 2021

(54) IMAGE FORMING APPARATUS, STATE CONTROL METHOD, AND NON-TRANSITORY COMPUTER-READABLE STORAGE MEDIUM

(71) Applicants: Yuji Tanaka, Kanagawa (JP); Takuya Murata, Tokyo (JP); Ko Tokumaru, Tokyo (JP)

(72) Inventors: Yuji Tanaka, Kanagawa (JP); Takuya Murata, Tokyo (JP); Ko Tokumaru, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/547,701

(22) Filed: Aug. 22, 2019

(65) Prior Publication Data
US 2020/0084336 A1  Mar. 12, 2020

(30) Foreign Application Priority Data

Sep. 10, 2018 (JP) .............................. JP2018-169157
Feb. 20, 2019 (JP) .............................. JP2019-028915

(51) Int. Cl.
*B41J 3/36* (2006.01)
*H04N 1/00* (2006.01)
*H04N 1/327* (2006.01)

(52) U.S. Cl.
CPC ............ *H04N 1/32736* (2013.01); *B41J 3/36* (2013.01); *H04N 1/00037* (2013.01); *H04N 1/00814* (2013.01)

(58) Field of Classification Search
CPC ..... B41J 3/36; B41J 3/39; B41J 3/4075; B41J 3/44; B41J 29/026; B41J 29/023; B41J 3/28; H04N 1/32736; H04N 1/00037; H04N 1/00814
USPC ................. 358/1.5, 1.11–1.18, 473; 400/88; 346/143; 347/109
See application file for complete search history.

(56) References Cited

U.S. PATENT DOCUMENTS

| | | | | |
|---|---|---|---|---|
| 5,927,872 A * | 7/1999 | Yamada | ...................... | B41J 2/36 400/88 |
| 5,988,900 A * | 11/1999 | Bobry | ........................ | B41J 3/39 346/143 |
| 2005/0135857 A1* | 6/2005 | Saund | ........................ | B41J 3/36 400/88 |
| 2008/0024583 A1* | 1/2008 | Noe | .......................... | B41J 3/28 347/109 |

(Continued)

FOREIGN PATENT DOCUMENTS

| | | |
|---|---|---|
| JP | 2010-522650 | 7/2010 |
| JP | 2018-144338 | 9/2018 |
| WO | WO2008/103998 A1 | 8/2008 |

*Primary Examiner* — Chad Dickerson
(74) *Attorney, Agent, or Firm* — IPUSA, PLLC

(57) ABSTRACT

An image forming apparatus includes an image forming device and circuitry. The image forming device is configured to form an image on a medium. The circuitry is configured to detect a position of the image forming device relative to the medium. The circuitry is further configured to control the image forming device based on the position of the image forming device detected and image data. The circuitry is further configured to control a system state of the image forming device based on the position of the image forming device associated with movement of the image forming device relative to the medium.

19 Claims, 23 Drawing Sheets

(56) References Cited

U.S. PATENT DOCUMENTS

| | | | |
|---|---|---|---|
| 2010/0149556 A1* | 6/2010 | Noe | B41J 3/36 358/1.5 |
| 2014/0044466 A1 | 2/2014 | Murata et al. | |
| 2014/0049199 A1 | 2/2014 | Ishizuka et al. | |
| 2015/0234362 A1 | 8/2015 | Murata et al. | |
| 2016/0214375 A1* | 7/2016 | Ikeda | B41J 3/36 |
| 2018/0250947 A1* | 9/2018 | Nakata | B41J 2/2146 |

* cited by examiner

PRINT IMAGE

IMAGE FORMING APPARATUS, STATE CONTROL METHOD, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application Nos. 2018-169157, filed on Sep. 10, 2018, and 2019-028915, filed on Feb. 20, 2019, in the Japan Patent Office, the entire disclosure of each of which is hereby incorporated by reference herein.

BACKGROUND

Technical Field

Embodiments of the present disclosure relate to an image forming apparatus, a state control method, and a non-transitory computer-readable storage medium.

Related Art

When carrying and using a smart phone, a notebook computer, or the like outside, the users may desire to print out a document with a printer. The users may also want to print various kinds of information on an object which is difficult to be set in a general printer.

To meet such demands, a handheld printer is known as an image forming apparatus downsized by removing a sheet conveyance system from a general printer.

SUMMARY

In one embodiment of the present disclosure, a novel image forming apparatus includes an image forming device and circuitry. The image forming device is configured to form an image on a medium. The circuitry is configured to detect a position of the image forming device relative to the medium. The circuitry is further configured to control the image forming device based on the position of the image forming device detected and image data. The circuitry is further configured to control a system state of the image forming device based on the position of the image forming device associated with movement of the image forming device relative to the medium.

Also described are novel state control method and non-transitory, computer-readable storage medium storing computer-readable program code that causes a computer to perform the state control method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1A:
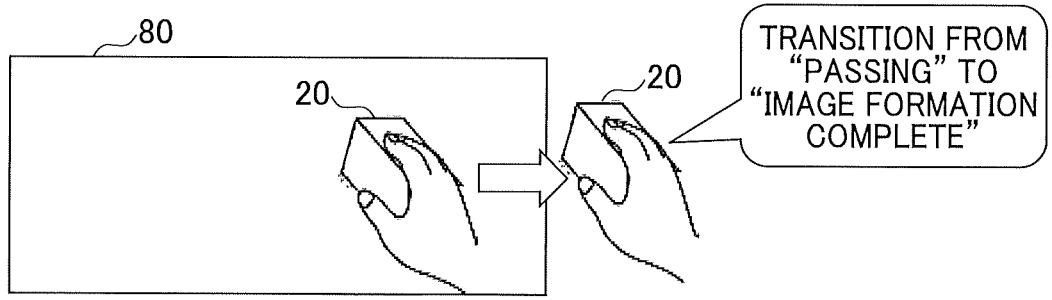
FIG. 1A is a diagram illustrating an example of control of system state transition performed by a handheld printer.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes C, M, Y, and K denote colors of cyan, magenta, yellow, and black, respectively. To simplify the description, these suffixes are omitted unless necessary.

Referring to the drawings, wherein like reference numerals designate identical or corresponding parts throughout the several views, embodiments of the present disclosure are described below.

Figure 1B:
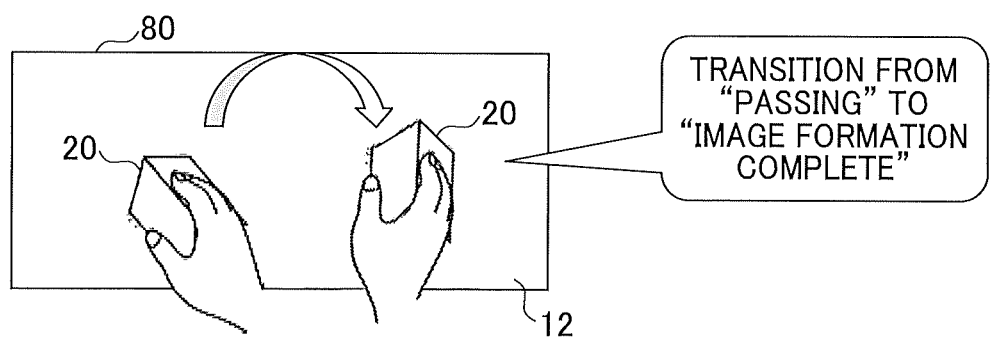
FIG. 1B is a diagram illustrating another example of control of system state transition performed by the handheld printer.

Initially with reference to FIGS. 1A and 1B, a description is given of some examples of control of system state transition performed by a handheld printer (HHP) according to an embodiment of the present disclosure.

According to the present embodiment, an HHP 20 changes the system state of the HHP 20 based on the state associated with the movement of the HHP 20 to reproduce an image. For example, when detecting that a moving or passing position of the HHP 20 is outside an image area, or when detecting that the HHP 20 is lifted or separated from a print medium, the HHP 20 changes the system state from "passing" (or a moving state) to "image formation complete" (or an image formation completion state).

FIG. 1A is a diagram illustrating an example of control of the system state transition performed by the HHP 20. FIG. 1B is a diagram illustrating another example of control of the system state transition performed by the HHP 20.

As illustrated in FIG. 1A, the HHP 20 sets an image area 80 in which the HHP 20 forms an area. A user, for example, passes the HHP 20 within the image area 80. In the present embodiment, when the user consciously or unconsciously moves the HHP 20 out of an image area, the HHP 20 changes the system state from "passing" to "image formation complete".

Alternatively, as illustrated in FIG. 1B, when detecting that the HHP 20 is separated from a print medium 12, the HHP 20 changes the system state from "passing" to "image formation complete", even when the user passes the HHP 20 within the image area.

As described above, according to the present embodiment, the HHP 20 changes the system state of the HHP 20 based on the state associated with the movement of the HHP 20 (e.g., detection of movement outside an image area or separation from a print medium). Completion of printing allows the user to start printing the next page, thereby reducing the frequency of user operations. Typically, in order to change the system state to "image formation complete", the user bothers to press a given button of an HHP, for example. According to the present embodiment, the user can forcibly complete printing of image data even while the printing is in progress, to print the next image data.

Note that the state of a droplet discharging device (e.g., HHP 20) associated with the movement of the droplet discharging device to reproduce an image on a print medium (e.g., print medium 12) refers to a conscious or unconscious state that occurs when the user moves or passes the droplet discharging device. In the present embodiment, examples of the state include moving outside an image area and separation of the droplet discharging device from a print medium. The examples of the state also include detection of a moving or passing amount based on which the droplet discharging device is determined to go beyond the print medium in an X-direction or a Y-direction regardless of the image area, and detection of the droplet discharging device finely vibrated or strongly held by the user on the print medium.

The system state refers to an internal state related to the operation of an HHP. The operation performed by the HHP is determined in each state. Conditions of transition from one state to another are determined.

Controlling the system state based on the position of an image forming device may refer to controlling the system state based on the position of a recording head, more specifically, the position of nozzles. Since the recording head is fixed to the HHP, controlling the system state based on the position of the image forming device may also refer to controlling the system state based on the position (i.e., any position such as the center or an end) of the HHP.

Figure 2:
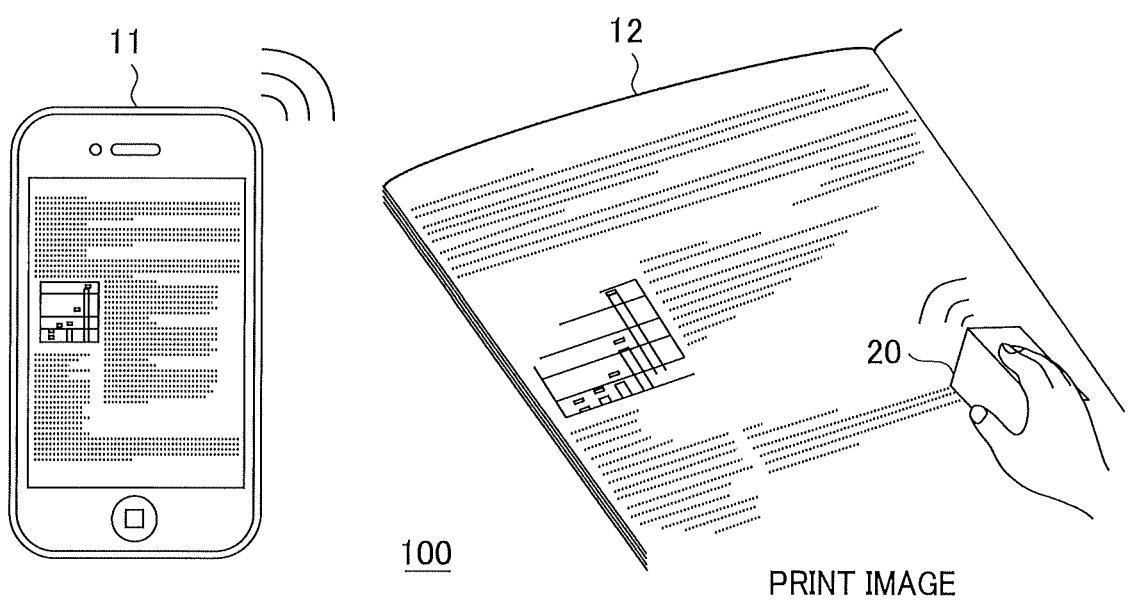
FIG. 2 is a schematic view of image formation by the handheld printer.

Referring now to FIG. 2, a description is given of image formation by the HHP 20.

FIG. 2 is a schematic view of image formation by the HHP 20.

The HHP 20 receives, from, e.g., an image data output device 11, image data and pass information such as pass modes (e.g., multi-pass mode, single pass mode), the pass direction as viewed from a user, the number of passes, and cancellation or retry of a print job. A droplet discharging system 100 refers to the HHP 20 and the image data output device 11, or programs that run on the HHP 20 and the image data output device 11. The user holds and passes HHP 20 freehand without lifting or separating the HHP 20 from the print medium 12 (e.g., standard paper or notebook).

The image data output device 11 is an information processing apparatus having a function of wireless or wired communication with the HHP 20. Examples of the image data output device 11 include a smartphone, a tablet terminal, a computer (e.g., personal computer (PC)), a personal digital assistant (PDA), a mobile phone, a handy terminal, a wearable computer (e.g., watch-type computer, sunglasses-type computer), a portable game machine, an automotive navigation system, a digital camera, a projector, and a video conference terminal.

As described later, the HHP 20 detects a position with a navigation sensor 30 alone or together with a gyro sensor 31. When arriving at a target discharging position, the HHP 20 discharges ink of a desired color at the target discharging position. As the place where the ink has already been discharged is masked and excluded from target discharging positions, the user passes the HHP 20 in a given direction to form an image on the print medium 12.

Separation of the HHP 20 from the print medium 12 is undesirable, apart from conscious separation. This is because the navigation sensor 30 uses the reflected light from the print medium 12 to detect a moving amount. When the HHP 20 is separated from the print medium 12, the navigation sensor 30 fails to detect the reflected light and the moving amount. A set of image data (herein referred to as a page), including Pn lines that can be formed in one operation, is formed based on an initial position. When the HHP 20 fails to detect the position during formation of the set of image data, the user instructs the image data output device 11 to cancel or retry the print job. In the present embodiment, the separation is likely to be detected in such a state. Accordingly, the system state changes to an "image formation complete" state without user operation.

The HHP 20 is, e.g., an inkjet printer that discharges ink to form an image on the print medium 12. The fluid to be discharged is not limited to the ink, provided that the fluid becomes liquid at least when the fluid is discharged. Therefore, the HHP 20 may be referred to as a droplet discharging device. Alternatively, since the HHP 20 forms an image, the HHP 20 may be referred to as an image forming apparatus or a printing apparatus. Alternatively, since the HHP 20 process an image, the HHP 20 may be referred to as an image processing apparatus. Alternatively, since the HHP 20 is portable by hand, the HHP 20 may be referred to as a handy mobile printer (HMP).

Note that, in the present embodiment, a description is given of the HHP 20 that discharges ink to form an image. The HHP 20 may form an image by a thermal transfer method or a dot impact method. The thermal transfer method may be a method of transferring an ink ribbon onto the print medium 12 with a thermal head. Alternatively, the thermal transfer method may be a method of coloring the print medium 12 as thermal paper with a thermal head. The dot impact method allows an image to be formed at once on a copy-type form such as an invoice or a slip.

The print medium 12 has at least one flat face as a part thereof. The flat face may be curved. Examples of the print medium 12 include a sheet, such as a paper sheet, and a notebook. The print medium 12 may be placed horizontally or vertically with respect to a desk or a floor. The print medium 12 is not limited to a sheet-like shape. In addition, the HHP 20 is capable of forming an image on a wall and a ceiling. Further, the HHP 20 is capable of printing an image on a side face, a bottom face, and a top face of a cardboard. Furthermore, the HHP 20 is capable of printing an image on a three-dimensional object fixed to the ground or a facility.

Figure 3:
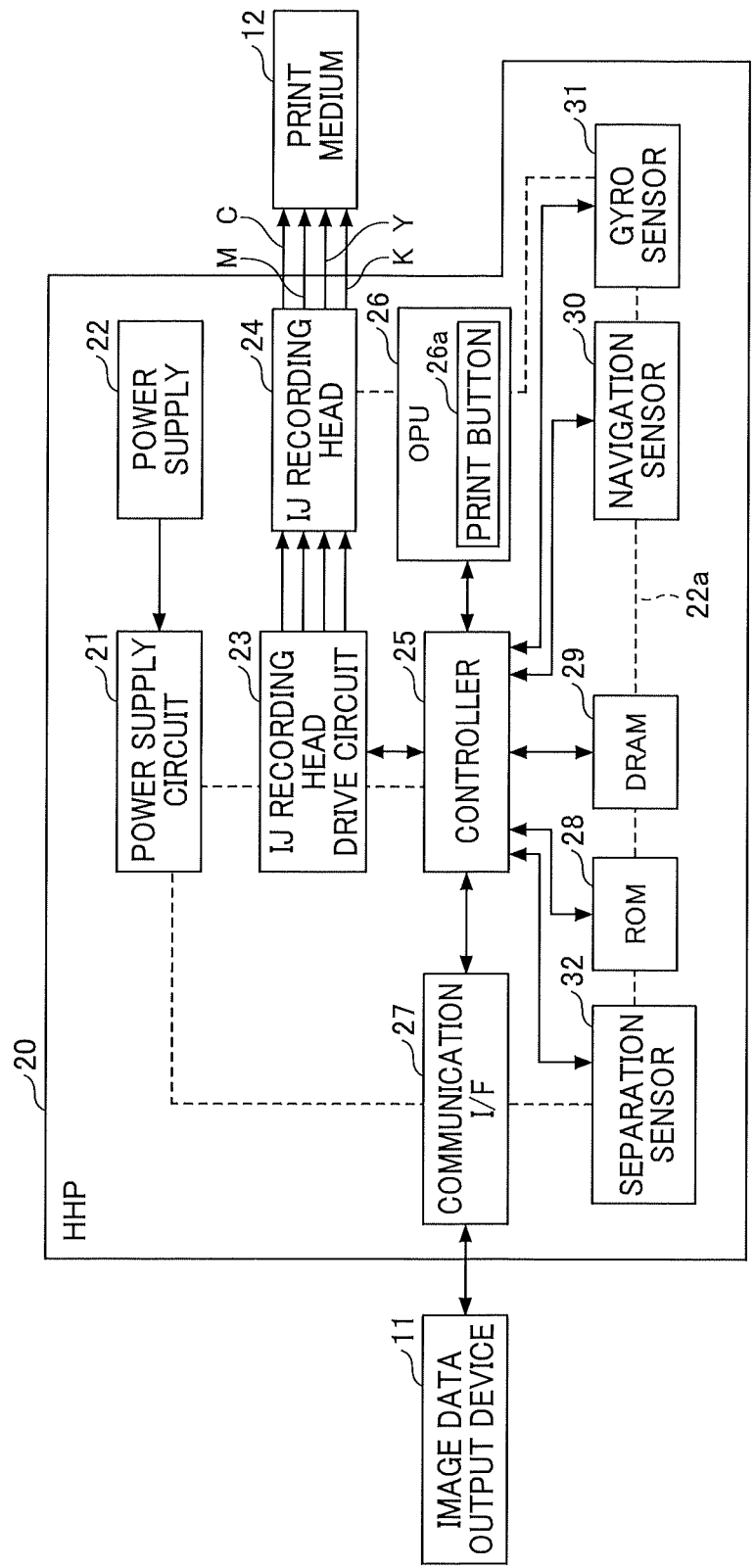
FIG. 3 is a block diagram illustrating a hardware configuration of the handheld printer.

Referring now to FIG. 3, a description is given of a hardware configuration of the HHP 20.

FIG. 3 is a block diagram illustrating a hardware configuration of the HHP 20.

The HHP 20 includes a controller 25 that controls an entire operation of the HHP 20. The controller 25 is electrically connected to a communication interface (I/F) 27, an inkjet (IJ) recording head drive circuit 23, an operational panel unit (OPU) 26, a read only memory (ROM) 28, a dynamic random-access memory (DRAM) 29, the navigation sensor 30, the gyro sensor 31, and a separation sensor 32. The HHP 20 includes a power supply 22 and a power supply circuit 21, so to be driven by electric power. The power supply circuit 21 generates and supplies the electric power to the communication I/F 27, the IJ recording head drive circuit 23, the OPU 26, the ROM 28, the DRAM 29, the IJ recording head 24, the controller 25, the navigation sensor 30, the gyro sensor 31, and the separation sensor 32, through, e.g., an electrical connection line 22a indicated by a broken line in FIG. 3.

A battery is mainly used as the power supply 22. The battery may be a commercially available dry cell or rechargeable battery. Alternatively, the battery may be a dedicated rechargeable battery. Alternatively, a solar cell, a commercial power source (alternating current (AC) power supply), a fuel cell, or the like may be used as the power supply 22. The power supply circuit 21 distributes the power supplied by the power supply 22 to each device of the HHP 20. In addition, the power supply circuit 21 decreases or increases the voltage of the power supply 22 so that the voltage becomes suitable for each device. When the power supply 22 is a rechargeable battery, the power supply circuit 21 detects the connection of the AC power supply and connects the AC power to a battery charging circuit, thereby enabling charging of the power supply 22.

The communication I/F 27 receives image data from the image data output device 11 such as a smartphone or a computer such as a PC. The communication I/F 27 is a communication device compatible with a communication standard such as a wireless local area network (LAN), Bluetooth (registered trademark), Near Field Communication (NFC), infrared, Third Generation (3G) (for mobile phone), or Long Term Evolution (LTE). The communication I/F 27 may be a communication device compatible with wired communication using a wired LAN, a universal serial bus (USB) cable, or the like, in addition to or instead of such wireless communication.

The ROM 28 stores firmware for controlling the hardware of the HHP 20, drive waveform data of the IJ recording head 24, initial setting data of the HHP 20, and the like. Note that the drive waveform data is data defining a voltage change for discharging a droplet.

The DRAM 29 stores image data received by the communication I/F 27 or the firmware loaded from the ROM 28. Therefore, the DRAM 29 is used as a working memory when the CPU 33 executes the firmware.

The navigation sensor 30 detects a moving amount of the HHP 20 for each given cycle time. The navigation sensor 30 includes, e.g., a light source such as a light emitting diode (LED) or a laser, and an imaging sensor that images the print medium 12. While the user passes the HHP 20 on the print medium 12, the navigation sensor 30 detects (or images) minute edges of the print medium 12 one after another to analyze a distance between the edges. Thus, the navigation sensor 30 acquires the moving amount. In the present embodiment, a single navigation sensor 30 is mounted on a bottom face of the HHP 20. Alternatively, two navigation sensors 30 may be provided. When the two navigation sensors 30 are provided, the controller 25 analyzes the moving amount of each of the two navigation sensor 30, thereby calculating an angle of rotation (i.e., a yaw angle of the HHP 20 with respect to an axis perpendicular to the print medium 12). The single navigation sensor 30 is provided in the present embodiment because the gyro sensor 31 is provided together with the single navigation sensor 30. Note that a multi-axis acceleration sensor may be used as the navigation sensor 30. In such a case, the HHP 20 may detect the moving amount of the HHP 20 with the acceleration sensor alone.

The gyro sensor 31 detects an angular velocity when the HHP 20 rotates about the axis perpendicular to the print medium 12. The controller 25 integrates the angular velocity to calculate the posture of the HHP 20. The posture is mainly the rotational angle (i.e., yaw angle). A reference of the rotational angle is, e.g., a longitudinal direction of the HHP 20 at the start of printing.

The separation sensor 32 detects the distance between the print medium 12 and the HHP 20. In other words, the separation sensor 32 detects a separation amount of the HHP 20. When the distance between the HHP 20 and the print medium 12 is equal to or greater than a threshold, the HHP 20 is lifted or separated from the print medium 12. The separation sensor 32 is, e.g., a mechanical switch that is turned on by the weight of the HHP 20 when the HHP 20 is in contact with the print medium 12. The switch detects, as a distance, an amount of the switch pressed into the HHP 20. Alternatively, the switch may simply detect whether the switch is pressed (i.e., turned on) or not (i.e., turned off). As another example, the separation sensor 32 may be a distance measuring sensor, such as an ultrasonic sensor or an infrared sensor, to detect the distance. Alternatively, the navigation sensor 30 may serve as the separation sensor 32 because the navigation sensor 30 detects the separation of the HHP 20 by the reflected light amount.

The OPU 26 includes, e.g., an LED and a switch. The LED displays the state of the HHP 20. The user uses the switch to instruct the HHP 20 to form an image. The components of the OPU 26 are not limited to the LED and the switch. The OPU 26 may include a liquid crystal display and may further include a touch panel. The OPU 26 may also have an audio input function. As illustrated in FIG. 3, the OPU 26 includes a print button 26a. The print button 26a receives a start of printing.

By use of the drive waveform data, the IJ recording head drive circuit 23 generates drive waveform (voltage) to drive the IJ recording head 24. For example, the IJ recording head drive circuit 23 generates the drive waveform according to the size of the ink droplet.

The IJ recording head 24 discharges ink to form an image. Since the IJ recording head 24 forms an image, the IJ recording head 24 may be referred to as an image forming device. As illustrated in FIG. 3, the IJ recording head 24 is capable of discharging ink of four colors, namely, cyan (C), magenta (M), yellow (Y), and black (K). Alternatively, the IJ recording head 24 may discharge ink of a single color or five or more colors. A plurality of nozzles, serving as a discharger, is disposed to discharge ink. Specifically, one or more lines of nozzles are arranged for each color. The IJ recording head 24 discharges ink from the plurality of nozzles by, e.g., a piezoelectric method, a thermal method, or the like. The IJ recording head 24 is a functional component that discharges or shoots liquid from the plurality of nozzles. The liquid to be discharged is not particularly limited, provided that the liquid has a viscosity and a surface tension dischargeable from the IJ recording head 24. The viscosity is preferably 30 mPa·s or less at normal temperature and pressure, or by heating or cooling. More specifically, the liquid may be, e.g., an emulsion, a suspension, or a solution containing e.g., a solvent such as water or an organic solvent, a colorant such as a dye or a pigment, a polymerizable compound, a functionalizing material such as a resin or a surfactant, a biocompatible material such as a deoxyribonucleic acid (DNA), an amino acid, a protein, or a calcium, or an edible material such as a natural pigment. Emulsions, suspensions, or solutions can be used as, e.g., inks for inkjet printing, surface treatment liquids, liquids for forming electronic circuit resist patterns and components of electronic devices and light-emitting devices, and three-dimensional modeling material liquids.

The controller 25 includes a central processing unit (CPU) to control the entire operation of the HHP 20. Based on the moving amount detected by the navigation sensor 30 and the angular velocity detected by the gyro sensor 31, the controller 25 calculates a position of each nozzle of the IJ recording head 24, determines an image to be formed according to the position, and determines whether to discharge ink from the nozzle, as described later. A detailed description of the controller 25 is deferred.

Figure 4:
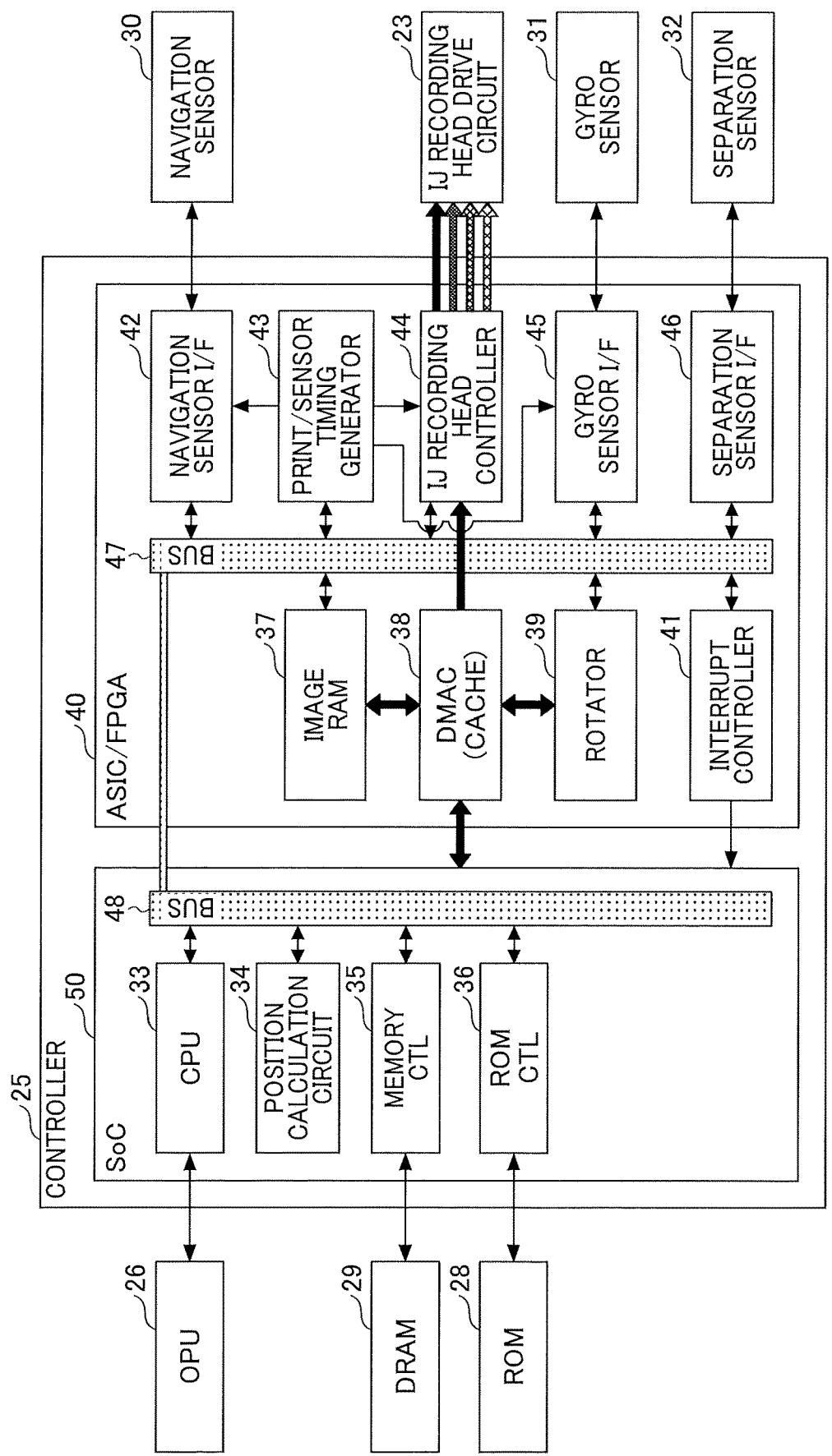
FIG. 4 is a block diagram illustrating a configuration of a controller included in the handheld printer.

Referring now to FIG. 4, a description is given of a configuration of the controller 25.

FIG. 4 is a block diagram illustrating a configuration of the controller 25.

The controller 25 includes a system on a chip (SoC) 50 and an application specific integrated circuit/field-programmable gate array (ASIC/FPGA) 40. The SoC 50 and the ASIC/FPGA 40 communicate with each other via buses 47 and 48. The ASIC/FPGA 40 may be designed by an ASIC or FPGA mounting technology. Alternatively, the ASIC/FPGA 40 may be configured by a mounting technology other than the ASIC or FPGA mounting technology. FIG. 4 illustrates the SoC 50 and the ASIC/FPGA 40 as separate chips. Alternatively, the SoC 50 and the ASIC/FPGA 40 may be mounted on a single chip or substrate. Alternatively, the SoC 50 and the ASIC/FPGA 40 may be mounted on three or more chips or substrates.

The SoC 50 has functions of e.g., a CPU 33 a position calculation circuit 34, a memory controller (CTL) 35, and a ROM CTL 36 connected to each other via the bus 48. Note that the components of the SoC 50 are not limited to the components illustrated in FIG. 4.

The ASIC/FPGA 40 includes an image RAM 37, a direct memory access controller (DMAC) 38, a rotator 39, an interrupt controller 41, a navigation sensor I/F 42, a print/sensor timing generator 43, an IJ recording head controller 44, a gyro sensor I/F 45, and a separation sensor I/F 46 connected to each other via the bus 47. Note that the components of the ASIC/FPGA 40 are not limited to the components illustrated in FIG. 4.

The CPU 33 executes firmware (i.e., program) or the like loaded from the ROM 28 to the DRAM 29, to control the operations of the position calculation circuit 34, the memory CTL 35, and the ROM CTL 36 in the SoC 50. The CPU 33 also controls the operations of the image RAM 37, the DMAC 38, the rotator 39, the interrupt controller 41, the navigation sensor I/F 42, the print/sensor timing generator 43, the IJ recording head controller 44, the gyro sensor I/F 45, and the separation sensor I/F 46 in the ASIC/FPGA 40.

The position calculation circuit 34 calculates a position (i.e., coordinate information) of the HHP 20, based on the moving amount detected by the navigation sensor 30 for each sampling cycle and the angular velocity detected by the gyro sensor 31 for each sampling cycle. The position of the HHP 20 refers to a nozzle position. Although the position directly detected is the position of the navigation sensor 30, the nozzle position can be calculated from the position of the navigation sensor 30. Note that the position calculation circuit 34 may be implemented by the CPU 33 as software.

The position of the navigation sensor 30 is calculated based on, e.g., a given origin as described later. The given origin is, e.g., an initial position of the HHP 20 at the time when the HHP 20 starts forming an image. In addition, the position calculation circuit 34 estimates a moving direction and acceleration based on a difference between a past position and a latest position, to predict a position of the navigation sensor 30 when the ink is discharged at the next time, for example. Thus, the HHP 20 discharges ink while reducing the delay from the movement of the HHP 20 by the user.

The memory CTL 35 is an interface between the controller 25 and the DRAM 29. The memory CTL 35 requests, e.g., data such as image data and firmware from the DRAM 29. The memory CTL 35 transmits the firmware and the image data thus acquired to the CPU 33 and the ASIC/FPGA 40, respectively.

The ROM CTL 36 is an interface between the controller 25 and the ROM 28. The ROM CTL 36 requests data from the ROM 28. The ROM CTL 36 transmits the data thus acquired to the CPU 33 and the ASIC/FPGA 40.

The rotator 39 rotates image data acquired by the DMAC 38, according to the position of the IJ recording head 24 that discharges ink, the positions of the nozzles in the IJ recording head 24, and the inclination of the IJ recording head 24 caused by a mounting error, or the like. The DMAC 38 outputs the image data thus rotated to the IJ recording head controller 44.

The image RAM 37 temporarily stores the image data acquired by the DMAC 38. That is, a certain amount of image data is buffered and read out according to the position of the HHP 20.

The IJ recording head controller 44 performs dithering or the like on the image data in, e.g., Tagged Image File Format (TIFF), to convert the image data into a set of points representing an image with size and density. Through such conversion, the image data becomes data of discharging positions and point sizes. The IJ recording head controller 44 outputs a control signal corresponding to the point size to the IJ recording head drive circuit 23.

By use of the drive waveform data corresponding to the control signal, the IJ recording head drive circuit 23 generates a drive waveform (voltage).

The navigation sensor I/F 42 communicates with the navigation sensor 30. The navigation sensor I/F 42 receives moving amounts $\Delta X'$ and $\Delta Y'$ as information from the navigation sensor 30. The navigation sensor 30 then stores values of the moving amounts $\Delta X'$ and $\Delta Y'$ in an internal register.

The print/sensor timing generator 43 notifies the navigation sensor I/F 42, the gyro sensor I/F 45, and the separation sensor 32 of the time when to read information. The print/sensor timing generator 43 also notifies the IJ recording head controller 44 of driving timing. The cycle at which the information is read is longer than the cycle at which the ink is discharged. The IJ recording head controller 44 determines whether to discharge ink from the nozzles. Specifically, the IJ recording head controller 44 determines to discharge ink upon detection of a target discharge position to which the ink is to be discharged. On the other hand, when no target discharge position is detected, the IJ recording head controller 44 determines not to discharge ink.

The gyro sensor I/F 45 acquires the angular velocity detected by the gyro sensor 31 at the time generated or notified by the print/sensor timing generator 43. The gyro sensor I/F 45 then stores a value of the angular velocity in a register.

At the time generated or notified by the print/sensor timing generator 43, the separation sensor I/F 46 acquires a distance between the print medium 12 and the bottom face of the HHP 20 detected by the separation sensor 32 (or information whether the HHP 20 is separated from the print medium 12). The separation sensor I/F 46 then stores a value of the distance in a register.

The interrupt controller 41 detects that the navigation sensor I/F 42 has completed communication with the navigation sensor 30. The interrupt controller 41 then outputs an interrupt signal to notify the SoC 50 that the navigation sensor I/F 42 has completed communication with the navigation sensor 30. With the interruption, the CPU 33 acquires the moving amounts $\Delta X'$ and $\Delta Y'$ stored, in the internal register, by the navigation sensor I/F 42. The interrupt controller 41 further has a function of providing information indicating a status such as an error. Similarly, the interrupt controller 41 detects that the gyro sensor I/F 45 has completed communication with the gyro sensor 31. The interrupt controller 41 then outputs an interrupt signal to notify the SoC 50 that the gyro sensor I/F 45 has completed communication with the gyro sensor 31. Similarly, the interrupt controller 41 detects that the separation sensor I/F 46 has completed communication with the separation sensor 32. The interrupt controller 41 then outputs an interrupt signal to notify the SoC 50 that the separation sensor I/F 46 has completed communication with the separation sensor 32.

Figure 5:
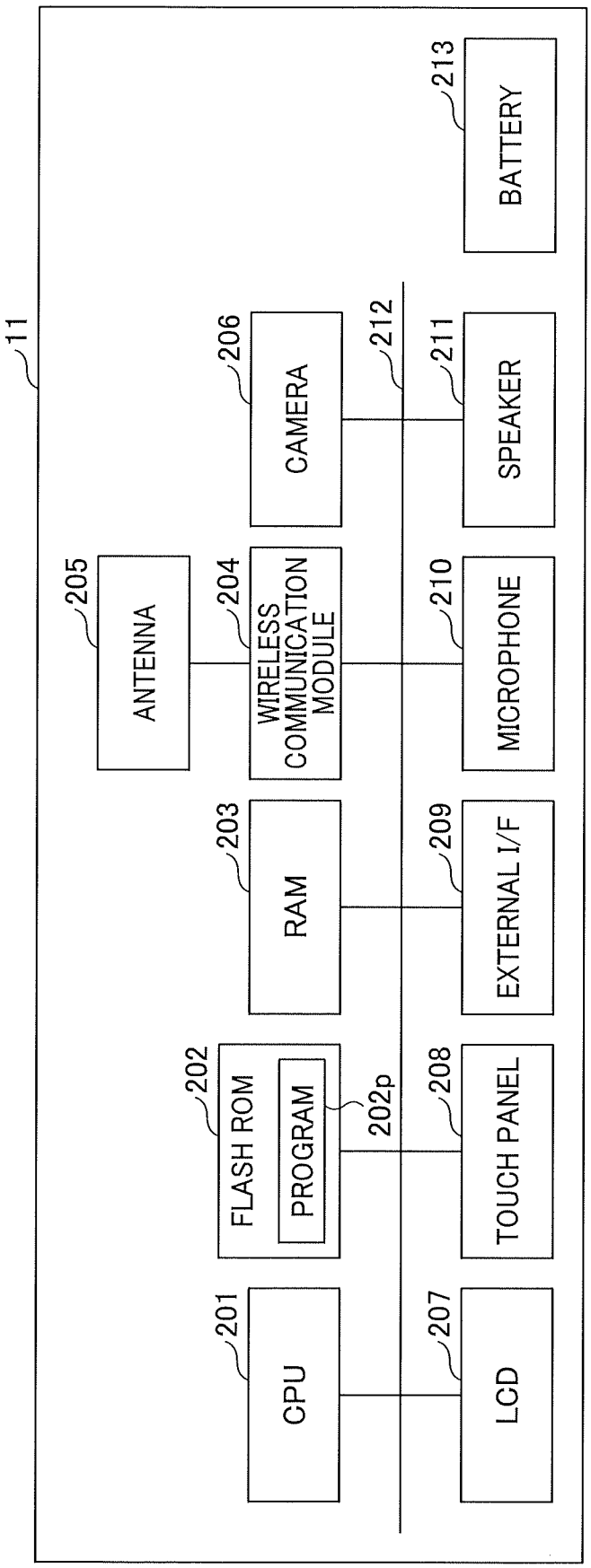
FIG. 5 is a block diagram illustrating a hardware configuration of an image data output device.

Referring now to FIG. 5, a description is given of a hardware configuration of the image data output device 11.

FIG. 5 is a block diagram illustrating a hardware configuration of the image data output device 11.

In the present example illustrated in FIG. 5, the image data output device 11 includes a CPU 201, a flash ROM 202, a RAM 203, a wireless communication module 204, an antenna 205, a camera 206, a liquid crystal display (LCD) 207, a touch panel 208, an external I/F 209, a microphone 210, and a speaker 211. The CPU 201, the flash ROM 202, the RAM 203, the wireless communication module 204, the antenna 205, the camera 206, the LCD 207, the touch panel 208, the external I/F 209, the microphone 210, and the speaker 211 are connected to each other via a bus 212 to exchange data. The image data output device 11 further includes a battery 213 to supply power to the devices described above.

The CPU 201 controls the image data output device 11 as a whole by, e.g., arithmetic processing of various kinds of data, in accordance with a program 202$p$ stored in the flash ROM 202. The flash ROM 202 stores the program 202$p$ to control the image data output device 11 as a whole. Meanwhile, the flash ROM 202 functions as a storage that stores various kinds of data. The program 202$p$ is an application developed for an appropriate operation of the HHP 20.

The RAM 203 is used as a working memory for the CPU 201. The program 202$p$ stored in the flash ROM 202 is loaded into the RAM 203 and executed by the CPU 201.

The wireless communication module 204 communicates with the HHP 20 by Bluetooth (registered trademark), a wireless LAN, the NFC, the infrared, or the like. The wireless communication module 204 may perform audio communication or data communication with the HHP 20 through a mobile phone line according to the 3G or LTE communication standard.

The camera 206 converts an analog image signal output from an imaging device into a digital signal. The LCD 207 displays various kinds of data and icons used to operate the image data output device 11. The touch panel 208 is laid on and in close contact with the LCD 207 to detect a position touched by a finger.

The external I/F 209 is an interface (e.g., USB interface) to link the image data output device 11 with an external device. The microphone 210 converts an analog audio signal input to the microphone 210 into a digital signal. The speaker 211 converts digital sound data into analog data to output an audible signal.

Figure 6:
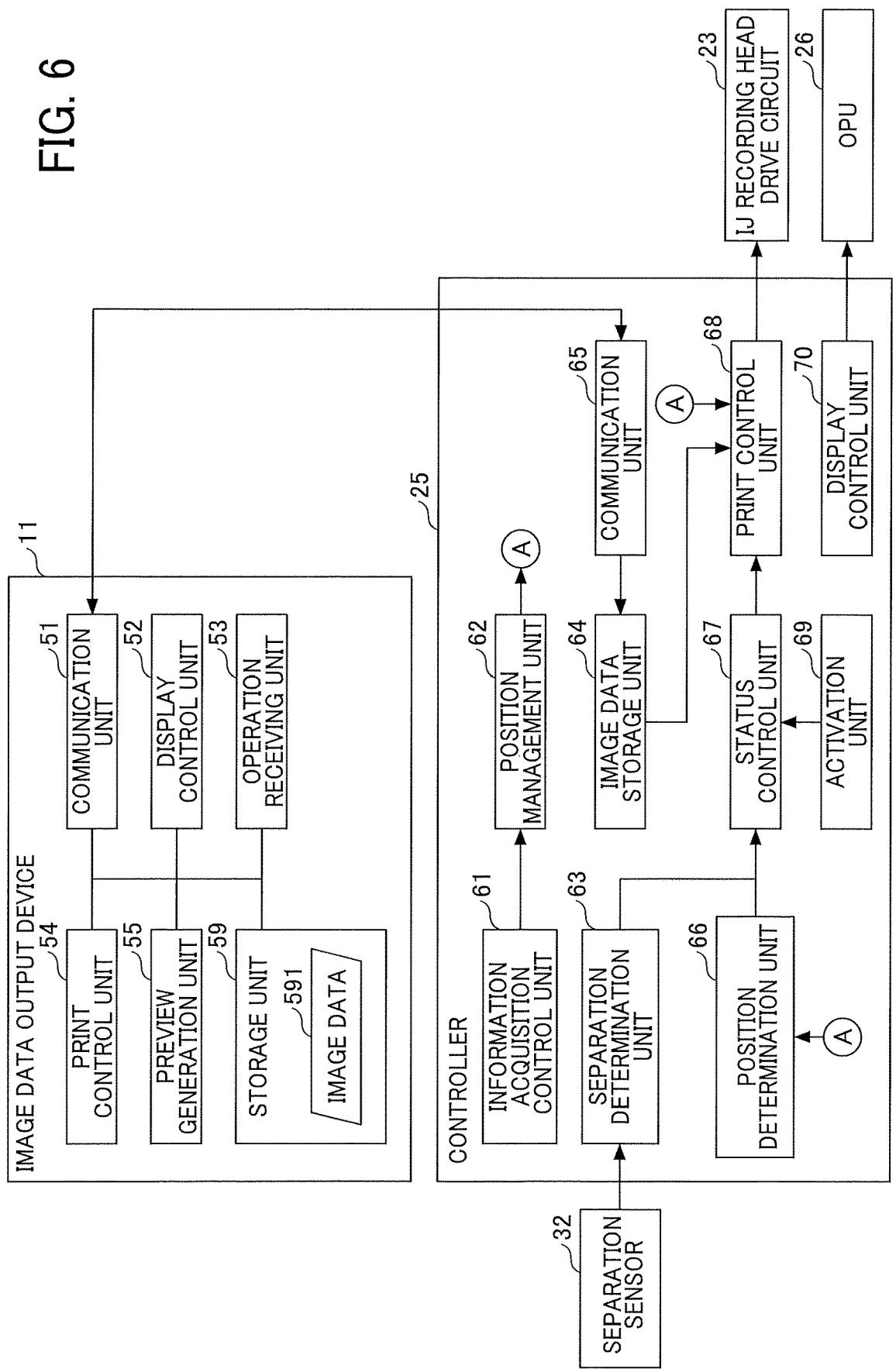
FIG. 6 is a block diagram illustrating functional configurations of the image data output device and the controller.

Referring now to FIG. 6, a description is given of functions of the image data output device 11 and the controller 25 described above.

FIG. 6 is a block diagram illustrating functional configurations of the image data output device 11 and the controller 25.

Initially, a description is given of the functions of the image data output device 11. The image data output device 11 includes, as functional units, a communication unit 51, a display control unit 52, an operation receiving unit 53, a print control unit 54, a preview generation unit 55, and a storage unit 59. The above-described functional units of the image data output device 11 are functions implemented by the CPU 201 executing the program 202$p$ and cooperating with the hardware illustrated in FIG. 5. Note that the program 202p may be distributed from a server for program distribution. Alternatively, the program 202p may be distributed as stored in a portable storage medium such as a USB memory or an optical storage medium.

The communication unit 51 exchanges various kinds of information with the HHP 20. In the present embodiment, the communication unit 51 transmits image data and the pass information to the HHP 20. On the other hand, the communication unit 51 receives the system state from the HHP 20. The communication unit 51 is implemented by, e.g., the CPU 201 executing the program 202p, which is loaded from the flash ROM 202 to the RAM 203, to control the wireless communication module 204.

The display control unit 52 controls display of various screens on the LCD 207. In the present embodiment, the display control unit 52 displays a preview of image data (e.g., a print finish image) on a preview screen. The display control unit 52 is implemented by, e.g., the CPU 201 executing the program 202p, which is loaded from the flash ROM 202 to the RAM 203, to control the LCD 207.

The operation receiving unit 53 receives various operations on the image data output device 11 by the user. The operation receiving unit 53 is implemented by, e.g., the CPU 201 executing the program 202p, which is loaded from the flash ROM 202 to the RAM 203, to control the touch panel 208.

The print control unit 54 controls printing of image data. Specifically, the print control unit 54 controls the communication with the HHP 20, the generation of image data, and the interruption and resumption of printing. The print control unit 54 is implemented by, e.g., the CPU 201 executing the program 202p, loaded from the flash ROM 202 to the RAM 203.

The preview generation unit 55 generates a preview screen. In addition, the preview generation unit 55 may generate, e.g., the position, orientation, shape, and color of an arrow indicating the pass direction as viewed from the user. The preview generation unit 55 is implemented by, e.g., the CPU 201 executing the program 202p loaded from the flash ROM 202 to the RAM 203.

The storage unit 59 stores image data 591. The image data 591 may be a file in any format. For example, the image data 591 is an image file in TIFF, Joint Photographic Experts Group (JPEG), or bitmap (BMP). Alternatively, the image data 591 may be print data described in a page description language (PDL), such as PostScript or Portable Document Format (PDF).

With continued reference to FIG. 6, a description is now given of the functions of the controller 25.

The controller 25 includes, as functional units, an information acquisition control unit 61, a position management unit 62, a separation determination unit 63, an image data storage unit 64, a communication unit 65, a position determination unit 66, a state control unit 67, a print control unit 68, an activation unit 69, and a display control unit 70. The above-described functional units of the controller 25 are functions implemented by the CPU 33 illustrated in FIG. 4 executing the program stored in the ROM 28.

The information acquisition control unit 61 determines whether it is time to acquire, from the sensors as described above, information detected by the sensors. When it is time to acquire the information, the information acquisition control unit 61 acquires the information from the sensors. The position management unit 62 determines an origin in response to a print start operation by a user. The position management unit 62 manages the nozzle position calculated by the position calculation circuit 34 relative to the origin.

When the power of the HHP 20 is turned on, the activation unit 69 performs an activation process, such as initialization of the hardware and detection of the hardware state. The display control unit 70 generates and displays information on the OPU 26.

The communication unit 65 communicates with the image data output device 11 to exchange various kinds of information. In the present embodiment, the communication unit 65 receives the image data and the pass information from the image data output device 11. On the other hand, the communication unit 65 transmits the system state to the image data output device 11.

The image data storage unit 64 stores image data established in the image RAM 37 or the like. The image data storage unit 64 stores the image data received by the communication unit 65.

The separation determination unit 63 determines whether the HHP 20 is separated from the print medium 12, based on the distance detected by the separation sensor 32. When the HHP 20 is separated from the print medium 12, the separation determination unit 63 measures, as a separation time, a period of time during which the HHP 20 is separated from the print medium 12. When the separation time is equal to or longer than a given period of time, the separation determination unit 63 notifies the state control unit 67 of the detection that the HHP 20 is separated.

The position determination unit 66 determines whether the nozzle position is inside or outside the image area 80. The position determination unit 66 measures, as an outside time, a period of time during which the nozzle position is outside the image area 80. When the outside time is equal to or longer than a given period of time, the position determination unit 66 notifies the state control unit 67 of the detection that the nozzle position is outside the image area 80.

Figure 10:
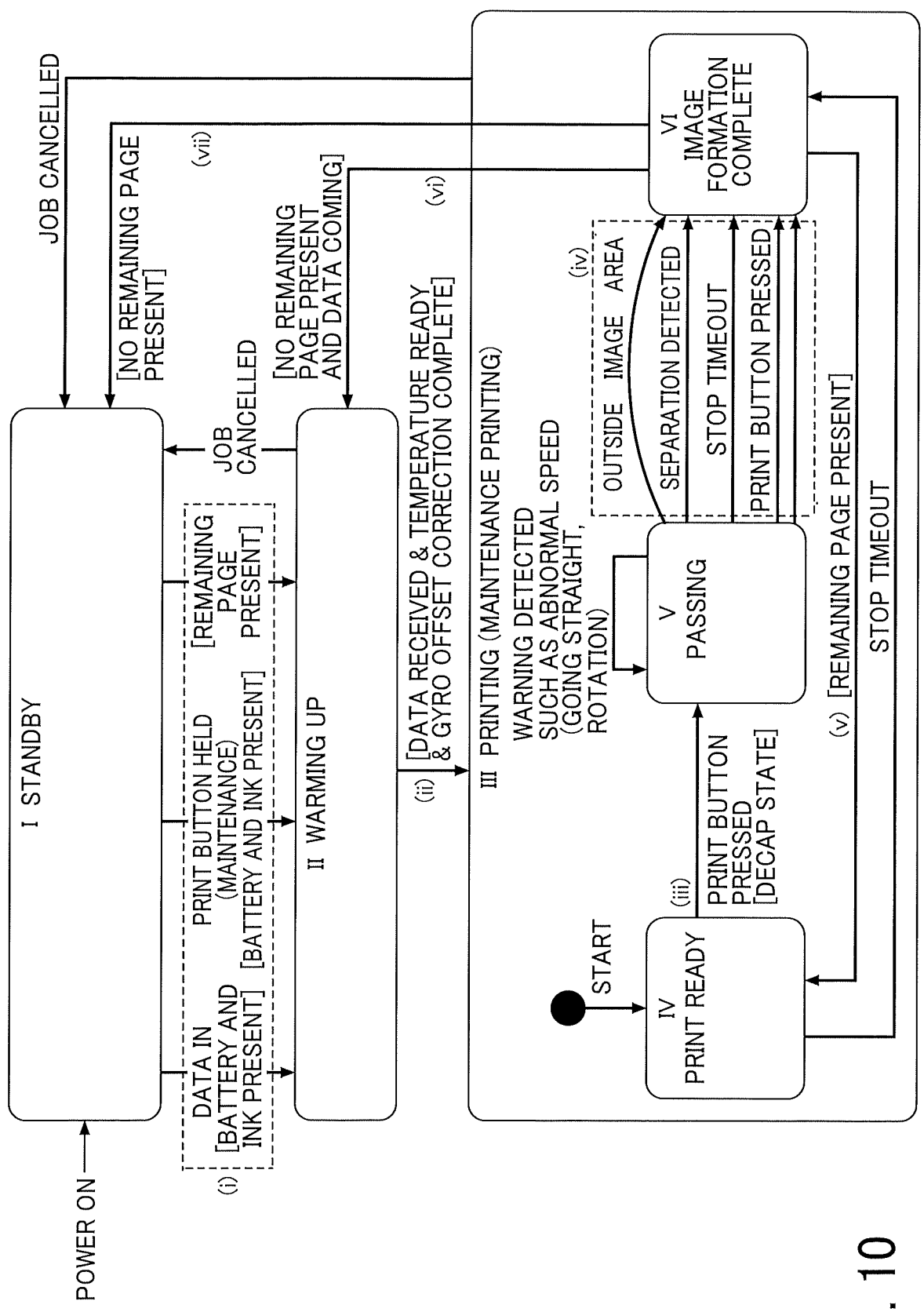
FIG. 10 is a diagram illustrating an example of system state transition of the handheld printer.

The state control unit 67 controls the system state of the HHP 20, based on the notification from the separation determination unit 63 or from the position determination unit 66 described above. Examples of the system state include a State I "standby", a State II "warming up", and a State III "printing", which includes a State IV "print ready", a State V "passing", and a State VI "image formation complete", as illustrated in FIG. 10.

The print control unit 68 controls the IJ recording head drive circuit 23 according to image data based on the nozzle position when the system state is "passing". Printing is not performed in other system states.

Figure 7:
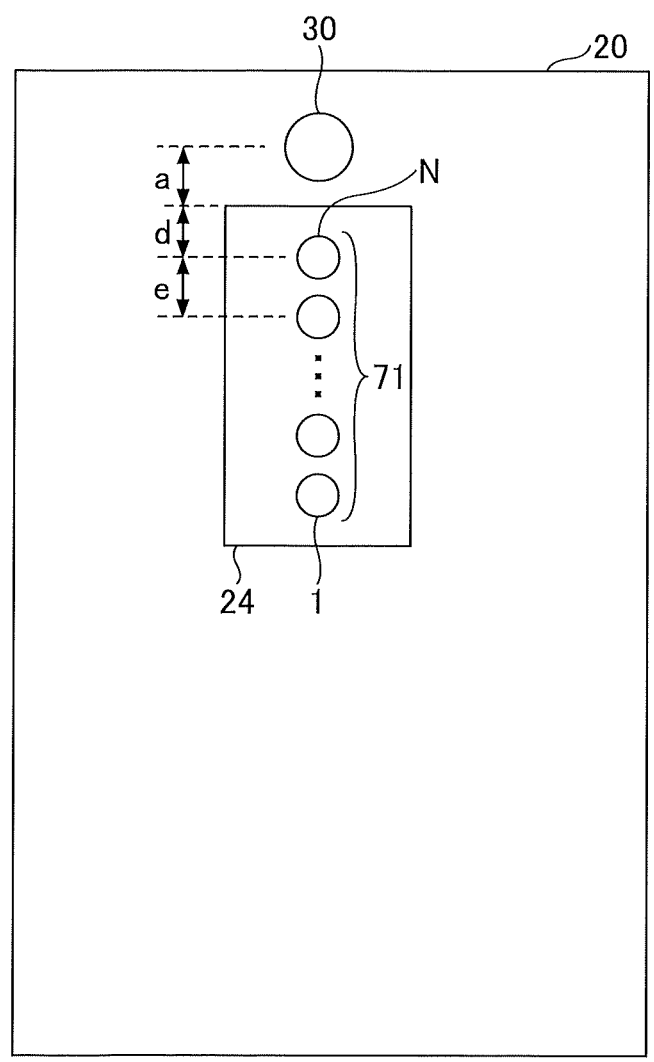
FIG. 7 is a diagram illustrating an example of a nozzle position on an inkjet recording head incorporated in the handheld printer.

Referring now to FIG. 7, a description is given of the nozzle position on the IJ recording head 24.

FIG. 7 is a diagram illustrating an example of the nozzle position on the IJ recording head 24 incorporated in the HHP 20.

FIG. 7 illustrates the bottom face of the HHP 20. The bottom face faces the print medium 12.

FIG. 7 illustrates the HHP 20 that includes a single navigation sensor 30.

In FIG. 7, "a" represents a distance from the navigation sensor 30 to the IJ recording head 24. The distance "a" may be zero. In such a case, the navigation sensor 30 is in contact with the IJ recording head 24. When the HHP 20 includes a single navigation sensor 30, the navigation sensor 30 may be disposed anywhere around the IJ recording head 24. The position of the navigation sensor 30 illustrated in FIG. 7 is merely an example. A shorter distance "a" between the IJ recording head 24 and the navigation sensor 30 may downsize the bottom face of the HHP 20.

When the HHP 20 includes two navigation sensors 30, a longer distance between the two navigation sensors 30 enhances the accuracy of detection of the angle of rotation. That is, the two navigation sensors 30 are preferably disposed in the longitudinal direction of the HHP 20. Similar to the case in which the HHP 20 includes a single navigation sensor 30, the two navigation sensors 30 may be disposed anywhere around the IJ recording head 24.

In FIG. 7, "d" represents a distance from an end of the IJ recording head 24 to the closest or top nozzle of a plurality of nozzles 71; whereas "e" represents a distance between adjacent nozzles. The values of the distances "a", "d", and "e" are stored in advance in the ROM 28 or the like.

When, e.g., the position calculation circuit 34 calculates the position of the navigation sensor 30 and the gyro sensor 31 detects an inclination, the position calculation circuit 34 calculates any nozzle position of the plurality of nozzles 71 by use of the distances "a", "d", and "e".

In FIG. 7, the plurality of nozzles 71 is located on the upper side in the longitudinal direction of the HHP 20. Such a location helps the user to intuitively ascertain the position of the plurality of nozzles 71 when the user holds the HHP 20. Alternatively, the plurality of nozzles 71 may be disposed at the center or elsewhere on the HHP 20.

The plurality of nozzles 71 includes N nozzles. In FIG. 7, the nozzles are numbered sequentially from 1 to N, starting at the nozzle located at the center of the HHP 20. The HHP 20 calculates the position for each nozzle. Alternatively, the nozzle numbers 1 to N may be assigned sequentially from the top. An image having a higher resolution can be obtained as the nozzle number N increases, provided that the distance "e" is constant. For example, N may be 192. However, N is not limited to 192.

Figure 8A:
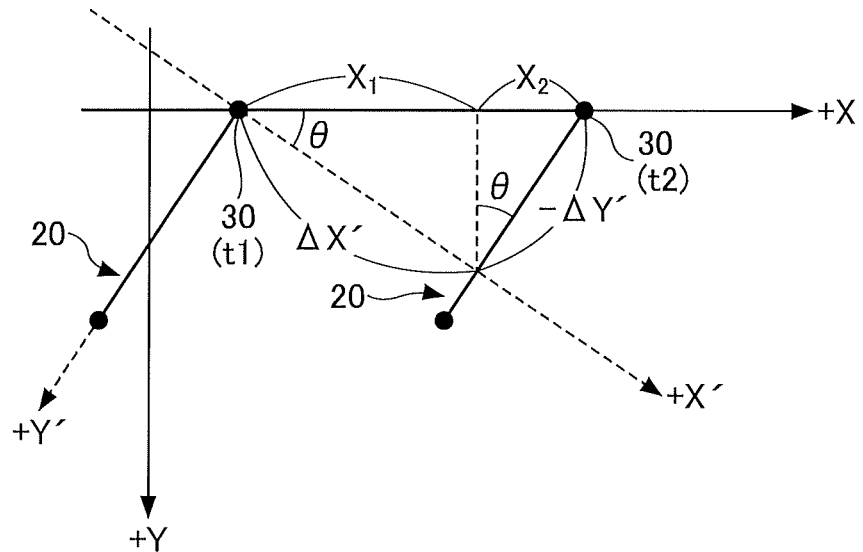
FIG. 8A is a graph illustrating an example of movement of the handheld printer in an X-direction.
Figure 8B:
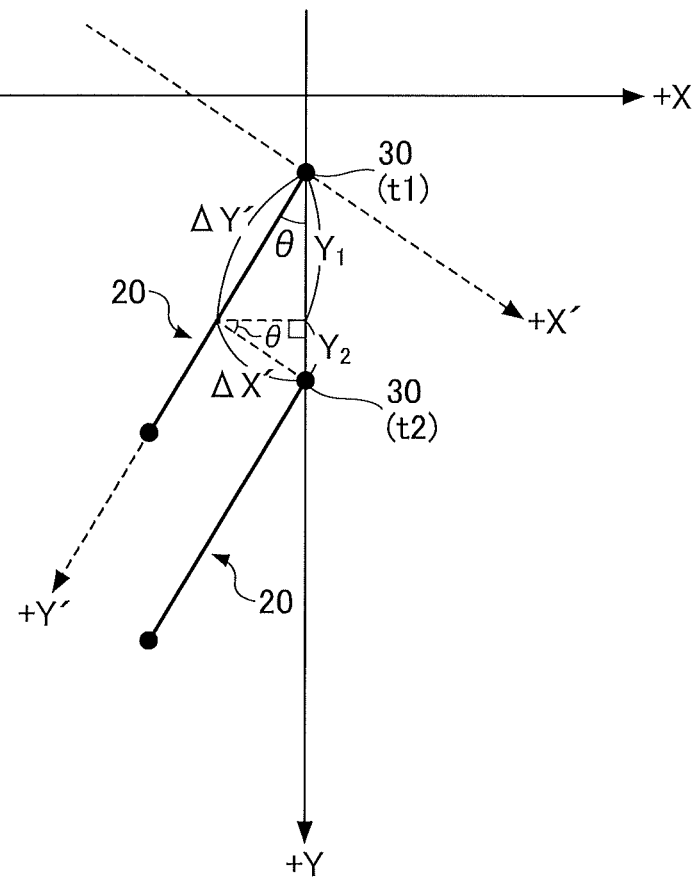
FIG. 8B is a graph illustrating an example of movement of the handheld printer in a Y-direction.

Referring now to FIGS. 8A and 8B, a description is given of the nozzle position.

FIGS. 8A and 8B illustrate the coordinate system of the HHP 20 and calculation of the position of the HHP 20.

In the present embodiment, the X-axis is a direction horizontal to the print medium 12. The Y-axis is a direction vertical to the print medium 12. The origin is a position of the N-th nozzle (or nozzle number N) or the first nozzle (or nozzle number 1) at the start of printing. The coordinates are herein referred to as print medium coordinates. On the other hand, the navigation sensor 30 outputs a moving amount with the coordinate axes (i.e., X'-axis and Y'-axis) illustrated in FIGS. 8A and 8B. Specifically, the Y'-axis indicates a direction in which the plurality of nozzles 71 is disposed; whereas the X'-axis indicates a direction perpendicular to the Y'-axis.

FIG. 8A illustrates a case in which the HHP 20 is rotated clockwise through an angle θ about the print medium 12.

The angle θ (i.e., angle of rotation) may not be zero because it may be hard for the user to pass the HHP 20 without any inclination with respect to the print medium coordinates. When the HHP 20 is not rotated at all, the relations X=X' and Y=Y' are satisfied. However, when the HHP 20 is rotated through the angle θ about the print medium 12, the output of the navigation sensor 30 and the actual position of the HHP 20 on the print medium 12 do not match. When the HHP 20 is rotated clockwise, the angle θ indicates a positive value. The right direction on the X-axis and the X'-axis indicates a positive direction. The downward direction on the Y-axis and the Y'-axis indicates a positive direction.

FIG. 8A is a graph illustrating the X-coordinate of the HHP 20.

FIG. 8A illustrates moving amounts ΔX' and ΔY' relative to the X and Y. The moving amounts ΔX' and ΔY' are detected by the navigation sensor 30 that moves from t1 to t2 while the HHP 20 rotated through the angle θ keeps the same angle of rotation (i.e., θ) in the X-direction alone.

Note that when the HHP 20 includes two navigation sensors 30, the outputs (i.e., moving amounts) of the two navigation sensors 30 are the same because the relative positions thereof are fixed. The X-coordinate of the navigation sensor 30 changes in the positive direction by "X1+X2". The "X1+X2" is calculated from ΔX',ΔY', and the angle θ.

FIG. 8B illustrates the moving amounts ΔX' and ΔY' relative to the X and Y. The moving amounts ΔX' and ΔY' are detected by the navigation sensor 30 that moves from t1 to t2 while the HHP 20 rotated through the angle θ keeps the same angle of rotation (i.e., θ) in the Y-direction alone.

The Y-coordinate of the navigation sensor 30 changes in the positive direction by "Y1+Y2". The "Y1+Y2" is calculated from ΔX',ΔY', and the angle θ.

That is, when the HHP 20 moves in the X-direction and Y-direction while keeping the same angle of rotation (i.e., θ), the moving amounts ΔX' and ΔY' output from the navigation sensor 30 can be converted into the X and Y of the print medium coordinates by $$X = \Delta X' \cos\theta - \Delta Y' \sin\theta \quad (1)$$

and $$Y = \Delta X' \sin\theta + \Delta Y' \cos\theta \quad (2).$$

Now, a description is given of the angle θ.

Specifically, a description is given of how to calculate the angle θ by use of an output of the gyro sensor 31.

The output of the gyro sensor 31 is an angular velocity ω. Since the angular velocity ω is obtained by "dθ/dt" (i.e., ω=dθ/dt), an angle dθ (i.e., angle of rotation) can be expressed as dθ=ω×dt, where "dt" represents a sampling cycle. Accordingly, a current angle θ (time t=0 to N) is as below.

$$\theta = \sum_{i=0}^{N} \omega_i \times dt$$

Thus, the angle θ can be obtained with the gyro sensor 31. The position can be calculated by use of the angle θ, as in Equations (1) and (2) above. With the position of the navigation sensor 30 thus calculated, the position calculation circuit 34 calculates the coordinates of each nozzle of the plurality of nozzles 71 based on the values of the distances "a", "d", and "e" illustrated in FIG. 7. Note that the X in Equation (1) and the Y in Equation (2) are changing amounts in the sampling cycle. Therefore, the current position can be obtained by accumulation of the X and Y.

Figure 9:
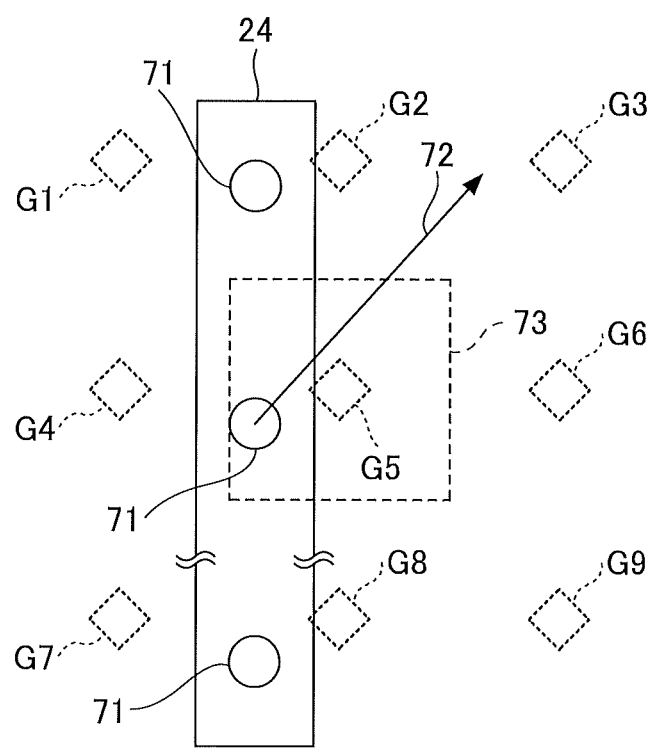
FIG. 9 is a diagram illustrating relative positions of target discharge positions and nozzles.

Referring now to FIG. 9, a description is given of the target discharging position.

FIG. 9 is a diagram illustrating relative positions of the target discharge positions and the plurality of nozzles 71.

Specifically, target discharging positions G1 to G9 are target positions at which the HHP 20 lands the ink from the plurality of nozzles 71. In other words, the target discharging positions G1 to G9 are destinations where pixels are formed. The target discharging positions G1 to G9 can be obtained from the initial position of the HHP 20 and the resolution (i.e., X dot per inch (dpi), Y dpi) in the X-axis and Y-axis directions of the HHP 20.

For example, when the resolution is 300 dpi, the target discharging positions are set at an interval of about 0.084 mm in the longitudinal direction of the IJ recording head 24 and in the direction perpendicular to longitudinal direction of the IJ recording head 24, with the initial position of the HHP 20 as a reference. The HHP 20 discharges ink when there are pixels to be faulted at the target discharging positions G1 to G9.

In actuality, however, it is hard to catch the time at which one of the plurality of nozzles 71 (hereinafter simply referred to as the nozzle 71) completely coincides with a corresponding target discharge position. To address such a situation, the HHP 20 is provided with a tolerance 73 between the target discharging position and a current position of the nozzle 71. When the current position of the nozzle 71 is within the tolerance 73 from the target discharging position, the HHP 20 discharges ink form the nozzle 71. With the tolerance 73, the HHP 20 determines whether to discharge ink from the nozzle 71.

As indicated by an arrow 72 in FIG. 9, the HHP 20 monitors the moving direction and the acceleration of the nozzle 71, thereby predicting the position of the nozzle 71 at the next discharging time. The HHP 20 compares the position thus predicted and the range of the tolerance 73 to prepare for discharging the ink.

Referring now to FIG. 10, a description is given of the system state of the HHP 20.

FIG. 10 is a diagram illustrating an example of system state transition of the HHP 20.

As illustrated in FIG. 10, the system state is classified mainly into three states, namely, the State I "standby", the State II "warming up", and the State III "printing". The State III "printing" is further classified into three states, namely, the State IV "print ready", the State V "passing", and the State VI "image formation complete". The system states illustrated in FIG. 10 are merely examples. The HHP 20 may have other states in addition to the states illustrated in FIG. 10.

The State I "standby" refers to a standby state. The State II "warming up" refers to a print preparation state. The State III "printing" refers to a state in which the HHP 20 can start printing immediately in response to a user operation. The State IV "print ready" refers to a state in which the HHP 20 waits for a given operation to receive a start of printing (image formation). For example, the HHP 20 waits for the user to press the print button 26*a*. The State V "passing" refers to a state in which the user passes the HHP 20. The State VI "image formation complete" refers to a temporary state in which printing of one page is complete, following the State V "passing".

The HHP 20 is in the State I "standby" immediately after being turned on. The system state changes from the State I "standby" to the State II "warming up" according to a transition condition (i), which includes that: data comes in; the print button 26*a* is held (for maintenance); and a remaining page is present. A detailed description of the remaining page is deferred.

The system state changes from the State II "warming up" to the State III "printing" according to a transition condition (ii), which includes that: data is received; temperature is ready; and gyro offset correction is complete. Immediately after a transition to the State III "printing", the system state becomes the State IV "print ready". The system state changes from the State IV "print ready" to the State V "passing" according to a transition condition (iii), which includes that the print button 26*a* is pressed. The system state changes from the State V "passing" to the State VI "image formation complete" according to a transition condition (iv), which includes that: the nozzle position is outside the image area; separation of the HHP 20 is detected; stop timeout; and the print button 26*a* is pressed. The system state changes from the State VI "image formation complete" to the State IV "print ready" according to a transition condition (v), which includes that a remaining page is present. The system state changes from the State VI "image formation complete" to the State II "warming up" according to a transition condition (vi), which includes that: no remaining pages are present; and data comes in. The system state changes from the State VI "image formation complete" to the State I "standby" according to a transition condition (vii), which includes that no remaining pages are present. For example, the transition condition (v) indicates that, when a remaining page is present after the system state changes to the State VI "image formation complete", the system state changes from State VI "image formation complete" to the State IV "print ready". When the user presses the print button 26*a*, the system state changes from the State IV "print ready" to the State V "passing". Note that the "remaining page" refers to a pass remaining to be printed when image data is divided into Pn passes and printed in a single pass mode described later. Therefore, when several operations are to be performed in the single pass mode, the user moves the HHP 20 out of the image area 80 and presses the print button 26*a* to start the next pass or movement. Thus, the operability of the HHP 20 is enhanced.

Note that, in a typical handheld printer, the system state is not changed to the "image formation complete" upon detection of an error that the handheld printer is separated from a print medium. In such a case, the user's work process often increases to recover the handheld printer from the error.

Figure 11:
FIG. 11 is a diagram illustrating an image area.

Referring now to FIG. 11, a description is given of the image area 80.

FIG. 11 is a diagram illustrating an example of the image area 80.

The image area 80 is a circumscribed rectangle of image data. The origin (0, 0) is a position of the top nozzle (i.e., N-th nozzle) when the print button 26*a* is pressed. The X-direction is a horizontal direction while the Y-direction is a vertical direction. The image area 80 is defined by the origin (0, 0), a maximum value Xmax of the X-coordinate of coordinates of the image data, and a maximum value Ymax of the Y-coordinate of the coordinates of the image data.

The image data transmitted from the image data output device 11 to the HHP 20 is in an image format converted from text data. Therefore, the position determination unit 66 detects the maximum value Xmax of the X-coordinate and the maximum value Ymax of the Y-coordinate from the image data.

Note that, in the single pass mode as described later with reference to FIG. 12, the image data output device 11 transmits, to the HHP 20, image data printable by one pass. Each area indicated by a dotted line may be referred to as the image area 80. Specifically, the user passes the HHP 20 one time to form an image of a first image area 80*a*. Then, the user starts passing the HHP 20 to form an image of a second image area 80*b*. Thereafter, the user starts passing the HHP 20 to form an image of a third image area 80*c*.

Figure 12:
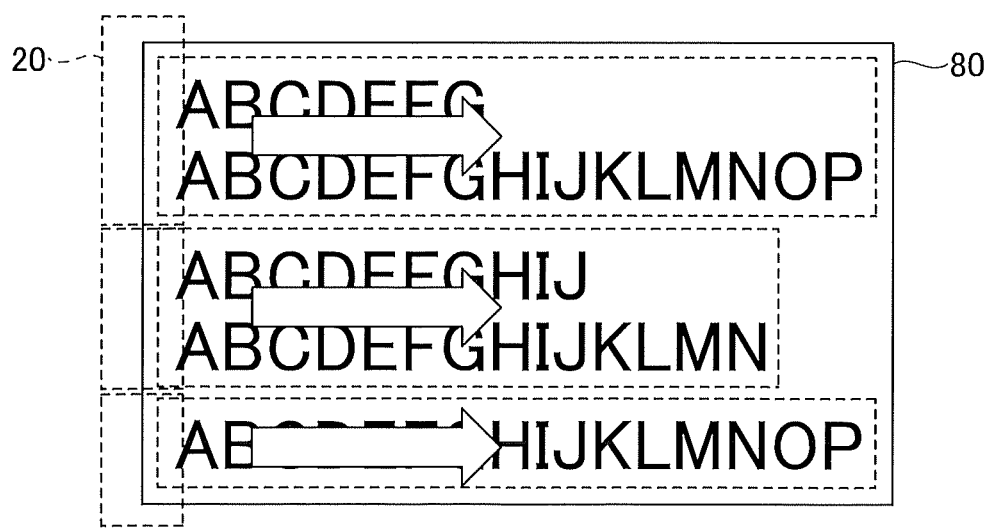
FIG. 12 is a diagram illustrating a single pass mode.
Figure 13:
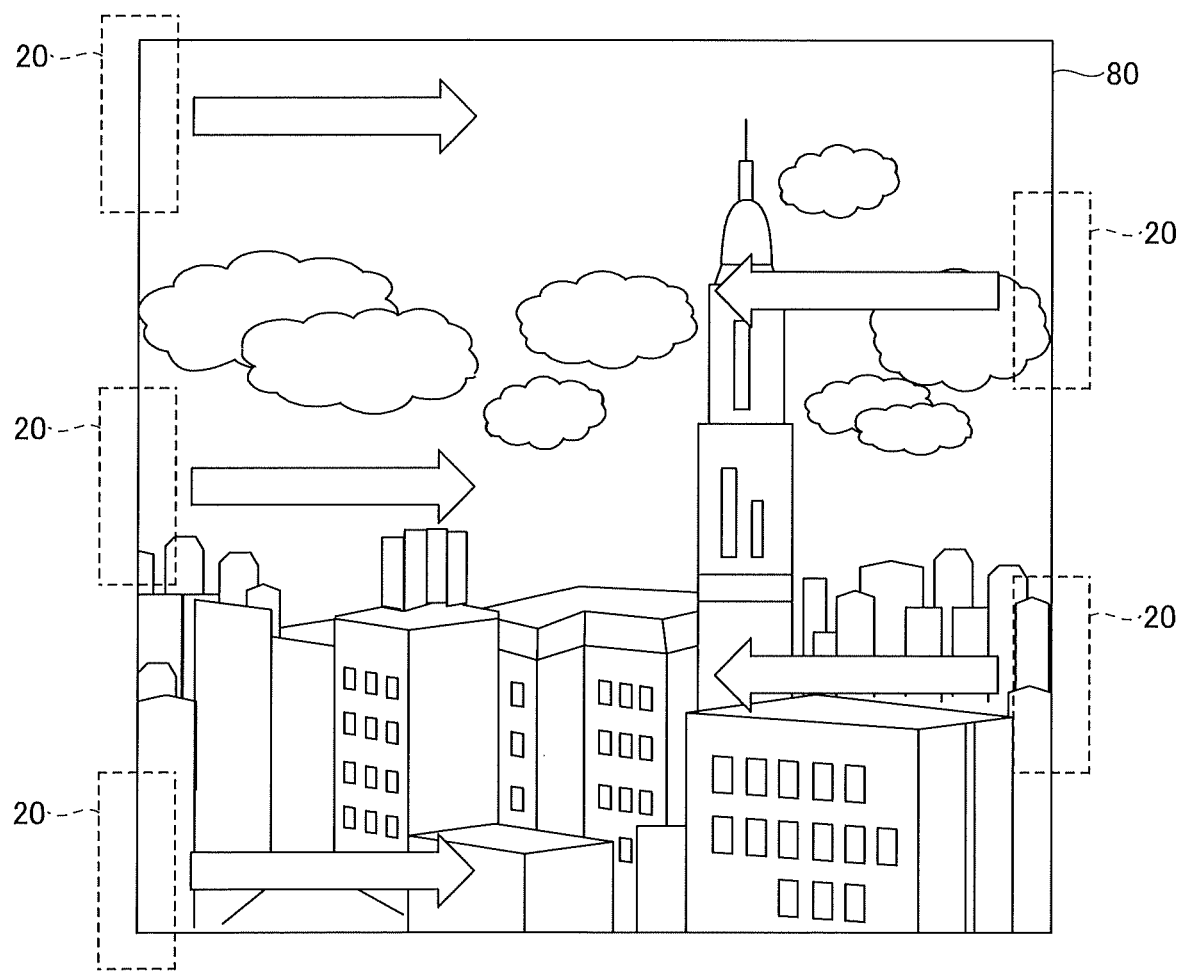
FIG. 13 is a diagram illustrating a multi-pass mode.

Referring now to FIGS. 12 and 13, a description is given of the pass modes of the HHP 20.

The pass modes include the single pass mode and a multi-pass mode. The multi-pass mode herein serves as a first pass mode or a bi-directional pass mode. The single pass mode herein serves as a second pass mode or a unidirectional pass mode.

It depends on the pass modes how to determine whether the nozzle position is inside or outside the image area. As described later with reference to FIG. 14, the user sets the single pass mode or the multi-pass mode in the image data output device 11.

Initially with reference to FIG. 12, a description is given of the single pass mode.

FIG. 12 is a diagram illustrating the single pass mode.

In the single pass mode, the HHP 20 performs printing when the HHP 20 is moved in a single direction alone. For example, the HHP 20 discharges ink simply when the user passes the HHP 20 left to right in FIG. 12. Therefore, in the single pass mode, the HHP 20 does not calculate the Y-coordinate. Even when the HHP 20 calculates the Y-coordinate, the HHP 20 does not use the Y-coordinate for the discharging control. Further, the position management unit 62 treats any one of the first to N-th nozzles or an average of the first to N-th nozzles as an X-coordinate of the plurality of nozzles 71 (i.e., first to N-th nozzles). This is because the first to N-th nozzles discharges ink at the same time to print image data of the same X-coordinate. Thus, the image quality in the single pass mode is enhanced.

In the single pass mode, the user may pass the HHP 20 right to left. When the origin is determined, the relative positions of the image data and the HHP 20 are also determined in the single pass mode, regardless of whether the user passes the HHP 20 right to left or left to right. Specifically, in a single pass mode of rightward movement (i.e., pass from user's left to right), the coordinates of the image data match the coordinates of the plurality of nozzles 71 simply when the user passes the HHP 20 left to right. By contrast, in a single pass mode of leftward movement (i.e., pass from user's right to left), the coordinates of the image data match the coordinates of the plurality of nozzles 71 simply when the user passes the HHP 20 right to left. In short, in the single pass mode, the HHP 20 discharges ink simply when the HHP 20 is moved in a given direction.

Note that, the single pass mode includes continuous single-pass printing. In the continuous single-pass printing, the pass direction as viewed from the user is changeable for each line.

The image data output device 11 calculates the number of movements (i.e., passes) to print image data. Specifically, the image data output device 11 calculates the number of passes "Pn" to print text data, based on the character size and the number of lines of the text data together with a height "h" (mm) of the plurality of nozzles 71 (i.e., first to N-th nozzles). The image data output device 11 then transmits Pn pieces of image data to the HHP 20. Such printing of the image data divided into Pn pieces is herein referred to as Pn-pass printing.

For example, when the character size is 16 points, the height of one line is 5.6 mm (i.e., 16×0.35 mm=5.6 mm). The "0.35" is a value used upon conversion of 1 point to millimeter. The height printable by one pass of the HHP 20 is equal to or less than the length of the IJ recording head 24 as specified. The length of the IJ recording head 24 is herein referred to as "h" (mm). Since the size (or point) of one character is limited in advance to the height "h" or less, printing one line of text does not include multiple passes. In other words, the character or character line is not cut. Accordingly, the HHP 20 prevents degradation of image quality.

The image data output device 11 adds the lines one by one to determine whether the height of the lines is equal to or less than the height "h". The line intervals may be preferably considered. Specifically, the image data output device 11 calculates the height of two lines in consideration of the character sizes and the line intervals. The image data output device 11 then compares the height of the two lines and the height "h" of the IJ recording head 24. The image data output device 11 repeats the comparison until the height of K lines is greater than the height "h" of the IJ recording head 24. The K−1 lines are the maximum lines printable by one pass.

Thus, the image data output device 11 calculates the number of lines printable by one pass. The image data output device 11 then divides image data into Pn passes, thereby transmitting the image data to the HHP 20. FIG. 12 illustrates three passes.

Referring now to FIG. 13, a description is given of the multi-pass mode.

FIG. 13 is a diagram illustrating the multi-pass mode.

In the multi-pass mode, the HHP 20 discharges ink both when the user passes the HHP 20 left to right and when the user passes the HHP 20 right to left in FIG. 13. The multi-pass mode has an advantage that reduces user's workload to pass the HHP 20. The multi-pass mode has another advantage that enables printing of large sized image unprintable by one pass.

Note that text data is printable in the multi-pass mode. However, characters printed in the multi-pass mode may reduce the image quality due to the limitation of the nozzle height "h".

Figure 14:
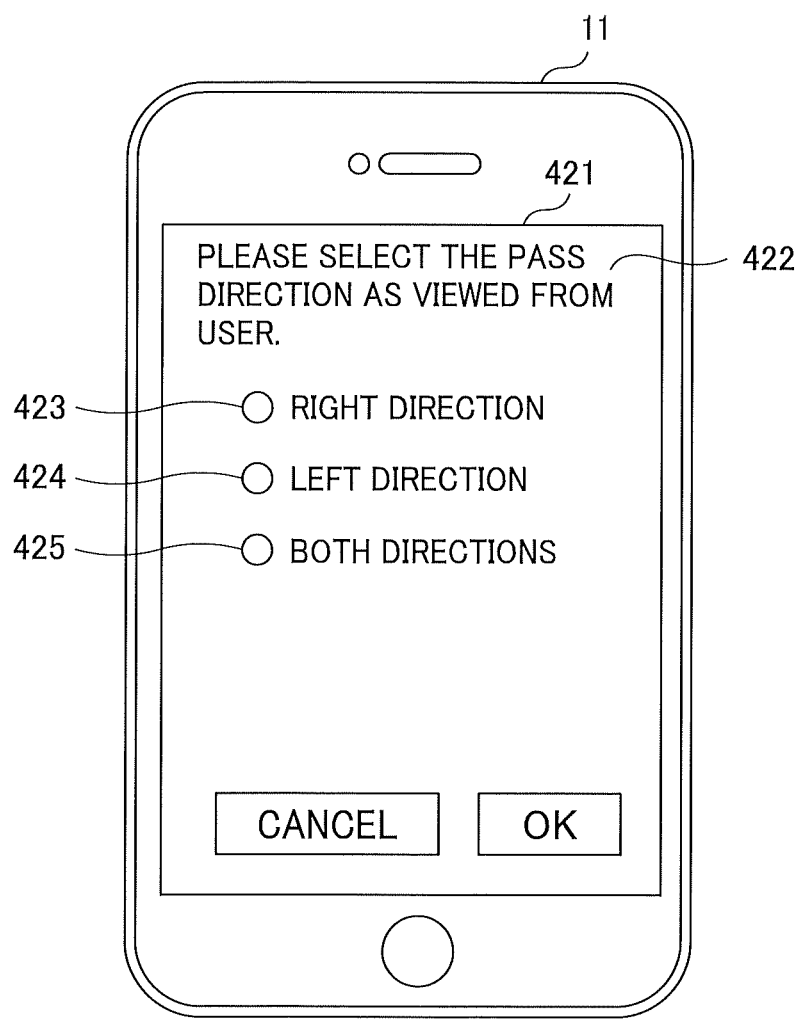
FIG. 14 is a view of the image data output device, illustrating a screen for setting a pass direction viewed from a user.

FIG. 14 is a view of the image data output device 11, illustrating a setup screen 421 for setting a pass direction as viewed from a user.

The setup screen 421 displays a message 422 and radio buttons 423, 424, and 425. The message 422 asks the user to set or select the pass direction as viewed from the user. The radio buttons 423, 424, and 425 are associated with selections "to the right", "to the left", and "both directions", respectively. The selections "to the right" and "to the left" correspond to the single pass mode. On the other hand, the selection "both directions" corresponds to the multi-pass mode. In addition, the continuous single-pass printing described above is selectable.

The user selects one of the three radio buttons 423 to 425. Note that a default value is determined even when the user does not select the pass direction as viewed from the user. The pass mode thus set or selected is transmitted to the HHP 20.

Note that the user can set, on the image data output device 11, whether to automatically change the system state of the HHP 20 based on the state associated with the movement of the HHP 20 (e.g., detection of movement outside an image area or separation from a print medium). This is because some users may not prefer such an automatic transition.

Referring now to FIGS. 15 to 22, a description is given of control of a state transition from "passing" to "image formation complete".

Figure 15A:
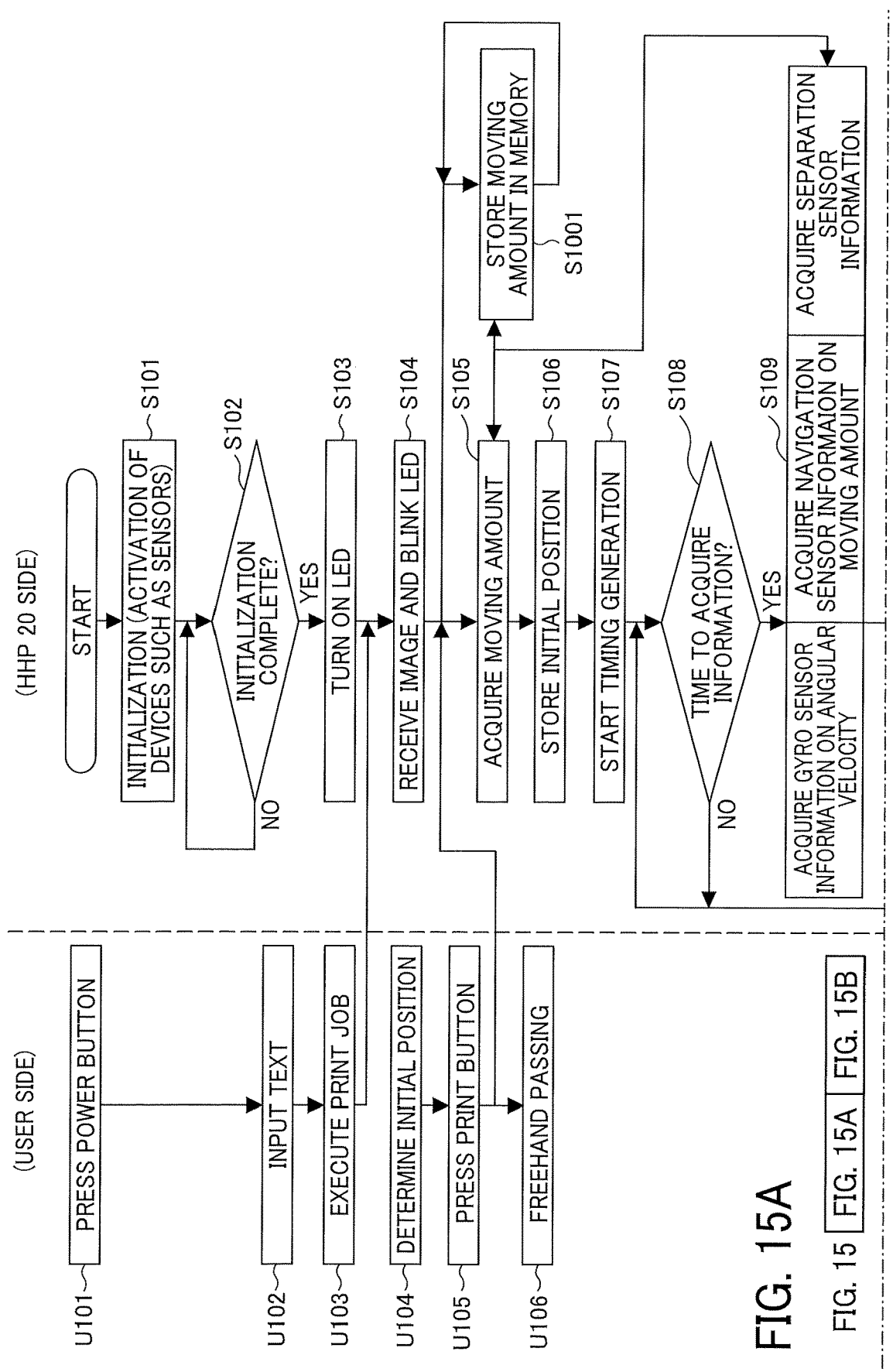
FIG. 15A is a flowchart of an operation process performed by the handheld printer together with user operations.
Figure 15B:
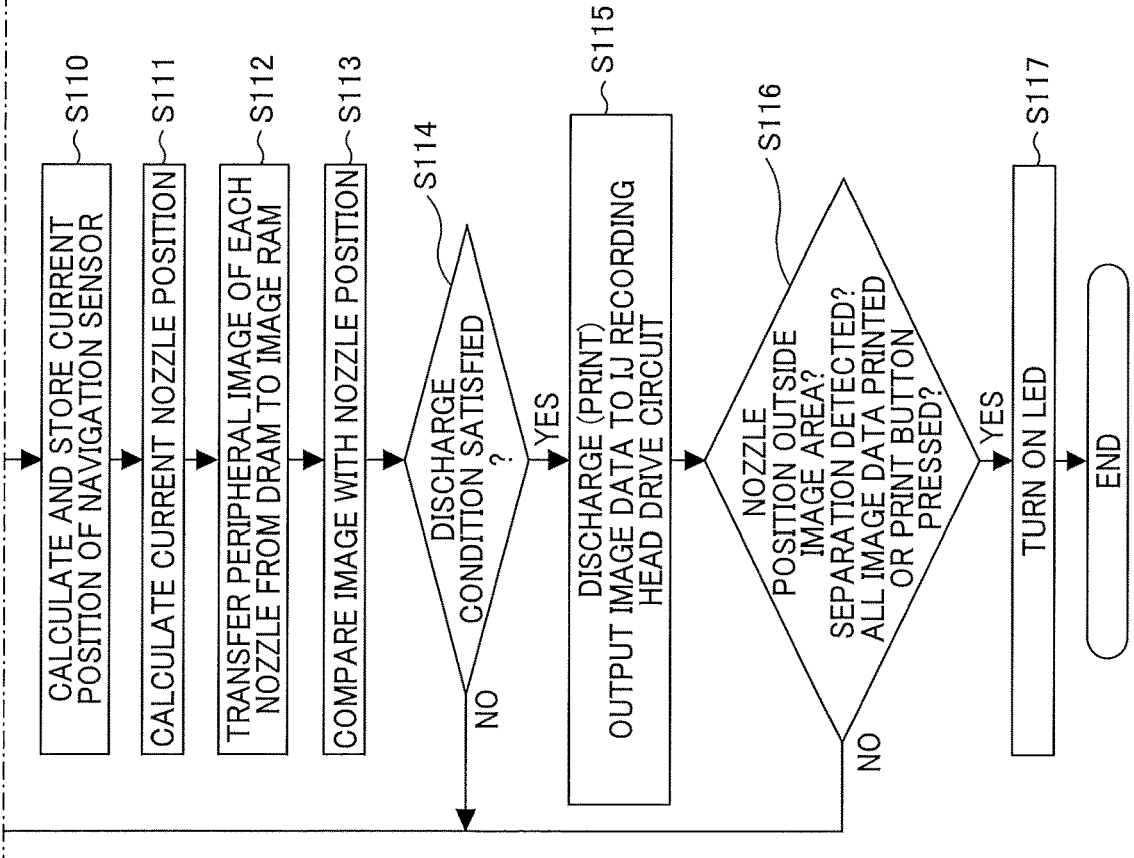
FIG. 15B is a continuation of the flowchart of the operation process illustrated in FIG. 15A.

Initially with reference to FIGS. 15A and 15B, a description is given of an overall operation.

FIG. 15A is a flowchart of an operation process performed by the HHP 20 together with user operations. FIG. 15B is a continuation of the flowchart of the operation process illustrated in FIG. 15A.

Firstly, a description is given of the user operations.

In step U101, a user presses the power button of the image data output device 11. In response to the power button being pressed, the image data output device 11 is activated with power supplied from, e.g., a battery.

In step U102, the user inputs text, as a print target, to a text input screen on the image data output device 11. The operation receiving unit 53 of the image data output device 11 receives the text input. Note that the print target may not be text data. In such a case, the user may select image data as a print target.

In step U103, the user operates the image data output device 11 to execute a print job to print the text thus input. Specifically, the user presses a print start button. The operation receiving unit 53 of the image data output device 11 receives the request for execution of the print job. In response to the request, the image data output device 11 transmits the image data and the pass information to the HHP 20.

In step U104, the user holds the HHP 20 and determines an initial position on the print medium 12 (e.g., notebook).

In step U105, the user presses the print button 26a of the HHP 20. The HHP 20 receives the pressing of the print button 26a.

In step U106, the user slides the HHP 20, thereby freely passing the HHP 20 on the print medium 12.

Now, a description is given of the operations of the HHP 20. The following operations are implemented by the CPU 33 executing the firmware.

The operation process of the HHP 20 starts with the power being turned on. That is, the HHP 20 is activated when the power is turned on.

In step S101, the activation unit 69 of the HHP 20 initializes the hardware elements built in the HHP 20 as illustrated in FIGS. 3 and 4. For example, the activation unit 69 initializes registers of the navigation sensor I/F 42 and the gyro sensor I/F 45. The activation unit 69 also sets a timing value to the print/sensor timing generator 43. In addition, the activation unit 69 establishes communication between the HHP 20 and the image data output device 11. For example, the user pairs in advance the image data output device 11 with the HHP 20 for Bluetooth (registered trademark) communication. With the communication established, the HHP 20 enters a "standby" state.

In step S102, the activation unit 69 of the HHP 20 determines whether the initialization is complete. When the initialization is not complete (NO in step S102), the activation unit 69 repeats the determination until the initialization is complete.

When the initialization is complete (YES in step S102), the display control unit 70 of the HHP 20 turns on the LED of the OPU 26, for example, thereby notifying the user that the HHP 20 is ready for printing in step S103. With the LED turned on, the user acknowledges that the HHP 20 is ready for printing and requests the execution of the print job as described above.

In step S104, the communication I/F 27 of the HHP 20 receives the image data transmitted by the image data output device 11 in response to the request for the execution of the print job. The display control unit 70 blinks the LED of the OPU 26, for example, thereby notifying the user that the image data is input to the HHP 20. Accordingly, the image data input, the HHP 20 enters a "warming-up" state. With completion of reception of the image data, the HHP 20 enters a printing state, more specifically, a print ready state.

When the user determines the initial position of the HHP 20 on the print medium 12 and presses the print button 26a, the OPU 26 of the HHP 20 receives the user operation. Then, the information acquisition control unit 61 causes the navigation sensor I/F 42 to read the position in step S105. Accordingly, the HHP 20 enters a "passing" state.

The navigation sensor I/F 42 communicates with the navigation sensor 30 to acquire the moving amount detected by the navigation sensor 30. The navigation sensor I/F 42 stores the moving amount in, e.g., a register in step S1001. The information acquisition control unit 61 retrieves the moving amount from the navigation sensor I/F 42.

The moving amount acquired immediately after the user presses the print button 26a may be zero. Even when the moving amount is not zero, the position management unit 62 stores the moving amount as an initial position of coordinates (0, 0), for example, in a register of the DRAM 29 or the CPU 33 in step S106.

When the initial position is acquired, the print/sensor timing generator 43 starts timing generation in step S107. When it is time to acquire the moving amount of the navigation sensor 30 set in the initialization, the print/sensor timing generator 43 informs the navigation sensor I/F 42, the gyro sensor I/F 45, and the separation sensor I/F 46 of the timing. Such an operation is periodically performed as the sampling period described above.

In step S108, the information acquisition control unit 61 of the HHP 20 determines whether it is time to acquire the moving amount, the angular velocity information, and the separating amount. With notification from the interrupt controller 41, the information acquisition control unit 61 performs the determining operation. Alternatively, the information acquisition control unit 61 may count the same timing as the timing generated by the print/sensor timing generator 43, thereby performing the determining operation.

When it is not time to acquire the moving amount, the angular velocity information, and the separating amount (NO in step S108), the information acquisition control unit 61 repeats the determining operation until the time comes. On the other hand, when it is time to acquire the moving amount, the angular velocity information, and the separating amount (YES in step S108), the information acquisition control unit 61 of the HHP 20 acquires the moving amount, the angular velocity information, and the separating amount from the navigation sensor I/F 42, the gyro sensor I/F 45, and the separation sensor I/F 46, respectively, in step S109.

In step S110, the position calculation circuit 34 calculates and stores a current position of the navigation sensor 30 by use of the angular velocity information and the moving amount. Specifically, the position calculation circuit 34 calculates a moving distance from the moving amount $(\Delta X', \Delta Y')$ and the angular velocity information acquired this time. The position calculation circuit 34 adds the moving distance to the position (X,Y) calculated in a previous cycle, thereby calculating the current position of the navigation sensor 30. When the initial position exists alone, that is, when there is no position calculated at a previous time, the position calculation circuit 34 adds, to the initial position, the moving distance calculated from the moving amount $(\Delta X', \Delta Y')$ and the angular velocity information acquired this time. Thus, the position calculation circuit 34 calculates the current position of the navigation sensor 30.

In step S111, the position calculation circuit 34 calculates a current position of each nozzle of the plurality of nozzles 71 (i.e., current nozzle position) by use of the current position of the navigation sensor 30.

As described above, the print/sensor timing generator 43 acquires the angular velocity information and the moving amount at the same time or substantially the same time.

Accordingly, the position calculation circuit 34 calculates the position of the plurality of nozzles 71 by use of the angle of rotation and the moving amount acquired at the time when the angle of rotation is detected. Although the position calculation circuit 34 calculates the position of the plurality of nozzles 71 based on the information of different types of sensors, the position calculation circuit 34 accurately calculates the position of the plurality of nozzles 71.

In step S112, the CPU 33 causes the DMAC 38 to transmit image data of a peripheral image of each nozzle of the plurality of nozzles 71 from the DRAM 29 to the image RAM 37 based on the position of each nozzle of the plurality of nozzles 71 thus calculated. Note that the rotator 39 rotates the image according to the tilt of the IJ recording head 24 and the head position designated by the user (e.g., how the HHP 20 is held).

In step S113, the IJ recording head controller 44 compares the position coordinates of each image element forming the peripheral image with the position coordinates of each nozzle of the plurality of nozzles 71. The position calculation circuit 34 calculates the acceleration of the plurality of nozzles 71 by use of a past position and the current position of the plurality of nozzles 71. Accordingly, the position calculation circuit 34 calculates the position of the plurality of nozzles 71 for each ink discharging cycle of the IJ recording head 24. The ink discharging cycle is shorter than the cycle in which the navigation sensor I/F 42 acquires the moving amount and the gyro sensor I/F 45 acquires the angular velocity information. In step S114, the IJ recording head controller 44 determines whether the position coordinates of the image elements are included in a given range from the position of the plurality of nozzles 71 calculated by the position calculation circuit 34. In other words, the IJ recording head controller 44 determines whether a discharge condition is satisfied.

When a discharging condition is not satisfied (NO in step S114), the process returns to step S108. On the other hand, when the discharging condition is satisfied (YES in step S114), the IJ recording head controller 44 outputs image element data to the IJ recording head drive circuit 23 for each nozzle of the plurality of nozzles 71 in step S115. Accordingly, the ink is discharged onto the print medium 12. The IJ recording head controller 44 updates a discharging control table.

In step S116, the state control unit 67 determines whether the nozzle position is outside an image area, whether the separation of the HHP 20 from a print medium is detected, and whether all image data is output or the print button 26a is pressed. When the determination in step S116 is NO, the process from step S108 to step S115 is repeated.

On the other hand, when the determination in step S116 is YES, the display control unit 70 turns on the LED of the OPU 26, for example, thereby notifying the user that the printing is complete in step S117.

Accordingly, the HHP 20 enters an "image formation complete" state. Thus, the process ends with the completion of image formation in FIGS. 15A and 15B.

Figure 16:
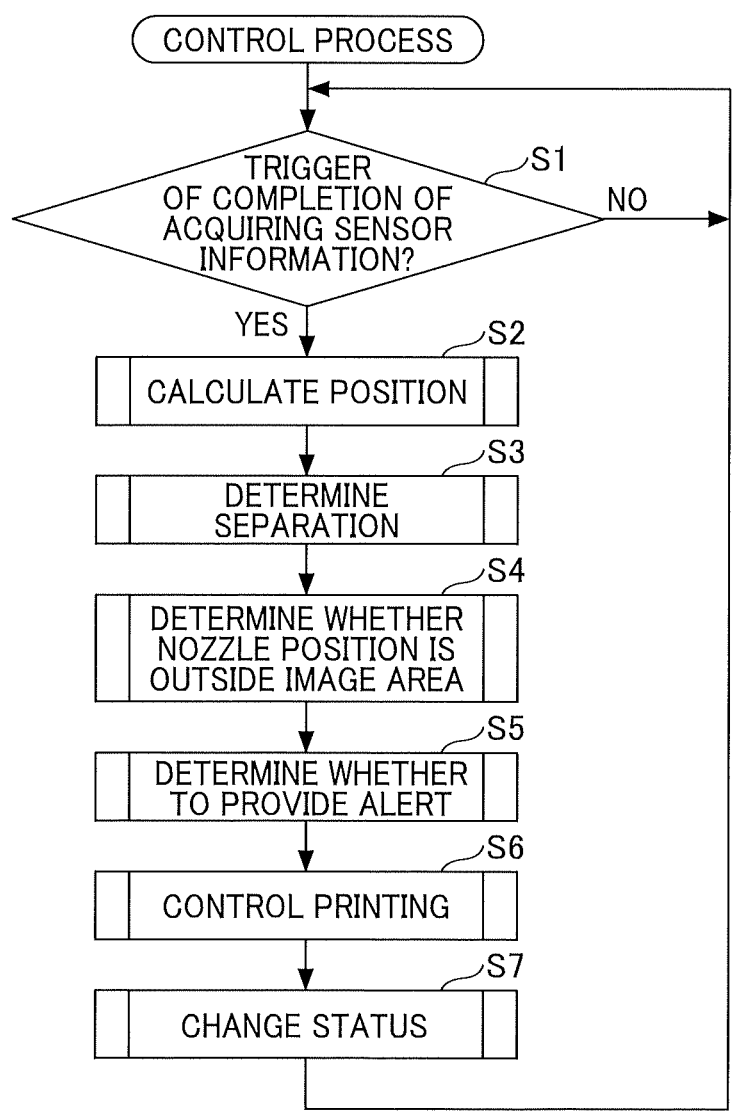
FIG. 16 is a flowchart of a process performed by the controller to control the system state of the handheld printer.

Referring now to FIG. 16, a description is given of control of the system state of the HHP 20.

FIG. 16 is a flowchart of a process performed by the controller 25 to control the system state of the HHP 20.

FIG. 16 illustrates a simplified process of FIGS. 15A and 15B, focusing on the state control. The process illustrated in FIG. 16 starts when the system state becomes the State III "printing" illustrated in FIG. 10.

In step S1, the controller 25 periodically acquires information of various sensors. In this cycle, the controller 25 determines whether the nozzle position is inside or outside an image area and whether the HHP 20 is separated from a print medium. The cycle is, e.g., several hundred nanoseconds to several milliseconds.

In step S2, the position calculation circuit 34 calculates the position based on the information detected by the navigation sensor 30 and the gyro sensor 31.

In step S3, the separation determination unit 63 determines whether the HHP 20 is separated from the print medium 12.

In step S4, the position determination unit 66 determines whether the position of the plurality of nozzles 71 (i.e., nozzle position) is outside the image area.

In step S5, the controller 25 periodically determines whether to provide an alert. For example, the controller 25 determines whether a pass speed is equal to or greater than a given speed, or whether the rotational speed is equal to or greater than a given speed. When the pass speed is equal to or greater than the given speed, or when the rotational speed is equal to or greater than the given speed, the controller 25 provides an alert by, e.g., turning on the LED or outputting a warning sound.

In step S6, based on the nozzle position calculated by the position calculation circuit 34, the print control unit 68 determines whether to discharge ink from the nozzle, thereby controlling printing (i.e., discharging ink).

In step S7, the state control unit 67 changes the system state based on the transition condition described above.

A detailed description is now given of steps S3, S4, and S7 described above.

Figure 17:
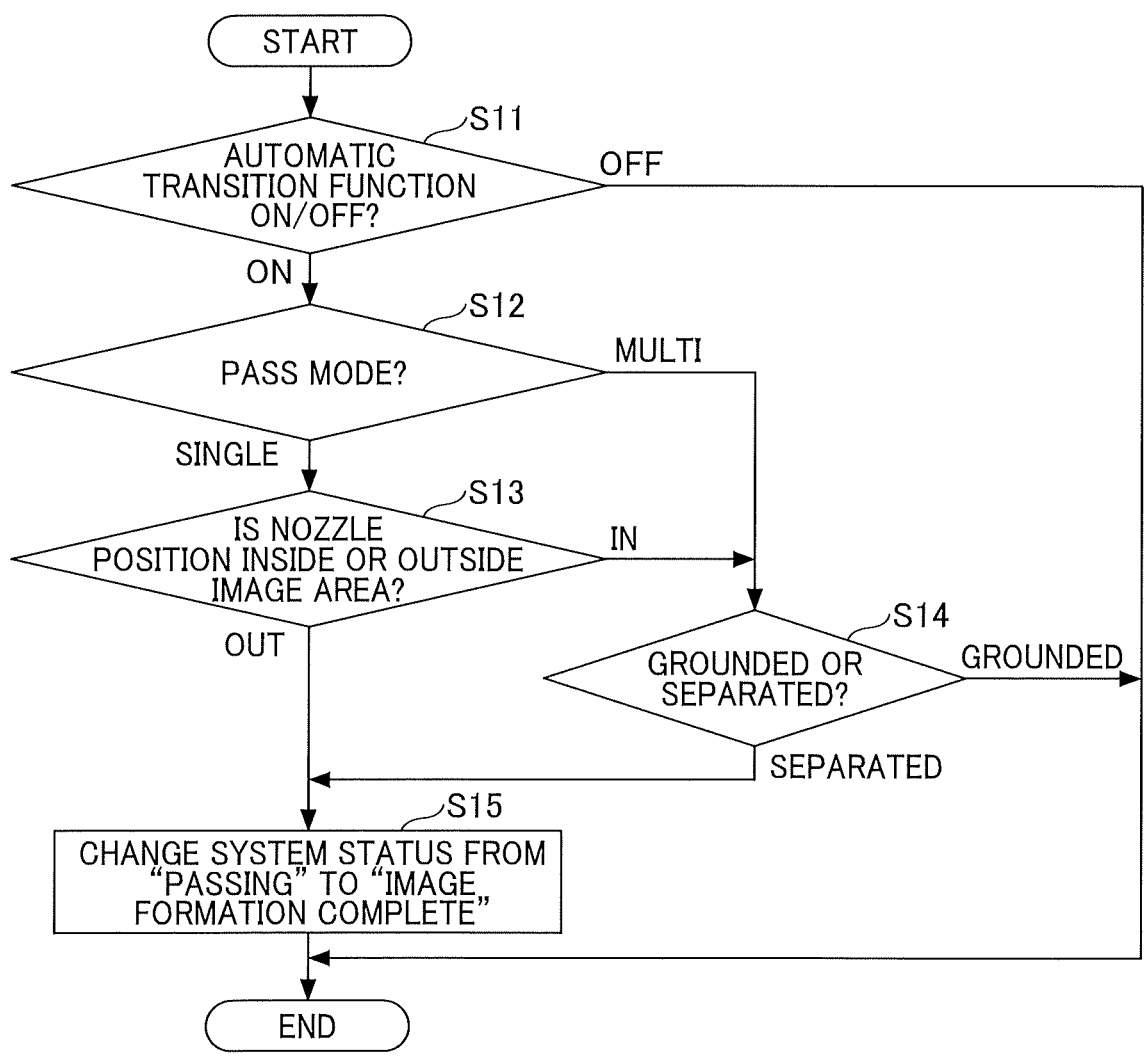
FIG. 17 is a flowchart illustrating a process for controlling a transition from "passing" to "image formation complete" according to determination as to whether the nozzle position is inside or outside an image area and whether the handheld printer is separated from a print medium.

Initially with reference to FIG. 17, a detailed description is given of step S7 illustrated in FIG. 16, that is, how to determine whether to change the system state.

FIG. 17 is a flowchart illustrating a process for controlling a transition from the State V "passing" to State VI "image formation complete" according to the determination as to whether the nozzle position is inside or outside the image area and whether the HHP 20 is separated from the print medium 12.

In step S11, the state control unit 67 determines whether an automatic transition function is activated (i.e., ON) or deactivated (i.e., OFF). The automatic transition function is a setting for changing the system state from the State V "passing" to the State VI "image formation complete" according to the determination on the nozzle position (i.e., determination as to whether the nozzle position is inside or outside the image area) and the determination on separation (i.e., determination as to whether the HHP 20 is separated from the print medium 12). Since the automatic transition function can be activated or deactivated by the user, the state control unit 67 determines whether the automatic transition function is set on or off in step S11.

When the state control unit 67 determines that the automatic transition function is set off (OFF in step S11), the process ends in FIG. 17.

On the other hand, when the automatic transition function is set on (ON in step S11), the state control unit 67 then determines whether the pass mode is the single pass mode or the multi-pass mode in step S12.

When the pass mode is the single pass mode (SINGLE in step S12), the process proceeds to step S13. In the single pass mode, the result of determination on the nozzle position is used for the system state transition. Specifically, in step S13, the state control unit 67 determines whether the determination result is that the nozzle position is inside the image area or that the nozzle position is outside the image area. By contrast, in the multi-pass mode, the result of determination on the nozzle position is unused for the system state transition. This is because the user may erroneously pass the HHP 20 outside the image area in the multi-pass mode. In the multi-pass mode, the system state "passing" is maintained even when the determination result is that the nozzle position is outside the image area. Since the result of determination on the nozzle position is unused for the system state transition in the multi-pass mode, an erroneous transition to the "image formation complete" state is prevented.

When the pass mode is the multi-pass mode (MULTI in step S12), or when the state control unit 67 determines that the determination result is that the nozzle position is inside the image area (IN in step S13), the state control unit 67 determines whether the result of determination on separation is that the HHP 20 is separated from the print medium 12 or that the HHP 20 is grounded on the print medium 12 in step S14.

When the state control unit 67 determines that the determination result is that the nozzle position is outside the image area (OUT in step S13), or when the state control unit 67 determines that the determination result is that the HHP 20 is separated from the print medium 12 (SEPARATED in step S14), the state control unit 67 then changes the system state from the State V "passing" to the State VI "image formation complete" in step S15.

On the other hand, when the state control unit 67 determines that the determination result is that the HHP 20 is grounded on the print medium 12 (GROUNDED in step S14), the process ends in FIG. 17.

As described above, according to the present embodiment, the controller 25 changes the system state of the HHP 20 based on the state associated with the movement of the HHP 20 by the user, thereby reducing the user operations such as pressing a button.

Note that, in the multi-pass mode in FIG. 17, the system state is unchanged when the nozzle position is determined as being outside the image area. Alternatively, however, the system state may be changed, in the multi-pass mode, when the nozzle position is determined as being outside the image area.

Referring now to FIGS. 18 to 21, a detailed description is given of step S4 illustrated in FIG. 16, that is, the determination on the nozzle position.

Figure 18:
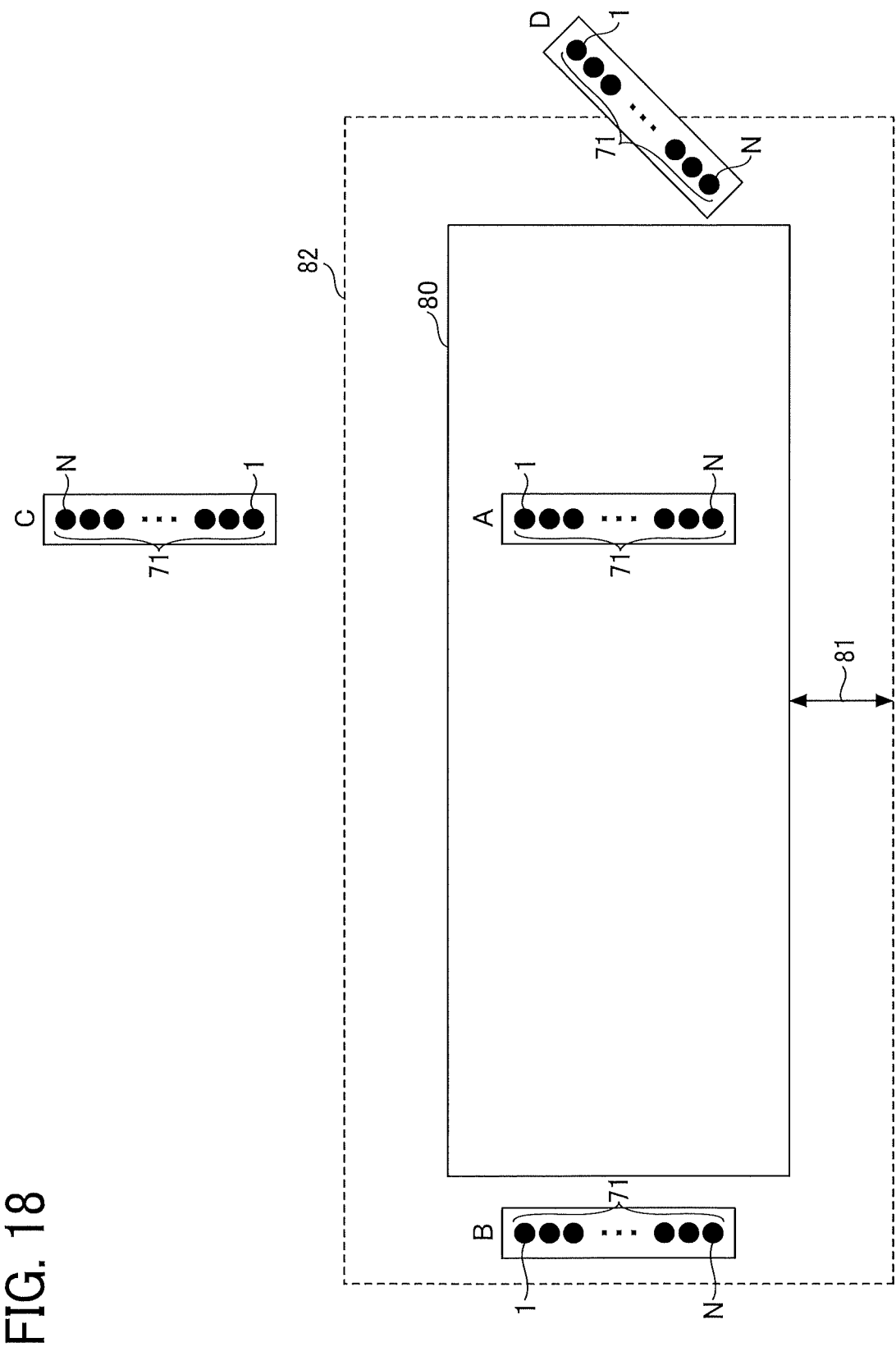
FIG. 18 is a diagram illustrating relative positions of the image area and the nozzles.

FIG. 18 is a diagram illustrating relative positions of the image area 80 and the plurality of nozzles 71.

A margin 81 is set around the image area 80. The margin 81 may be defined as "R % of the image area 80". Alternatively, the margin 81 may have a given length in the horizontal and vertical directions. The position determination unit 66 sets the margin 81 around the image area 80 to determine whether the nozzle position (i.e., the position of the plurality of nozzles 71) is inside or outside an area 82, which is constructed of the image area 80 and the margin 81. In the following description, for the sake of simplicity, the determination on the nozzle position refers to the determination whether the nozzle position is inside or outside the area 82.

FIG. 18 illustrates four nozzle positions A to D.

When the plurality of nozzles 71 is located at the nozzle position A or B, all of the first to N-th nozzles of the plurality of nozzles 71 are inside the image area 80 or the area 82. Accordingly, the position determination unit 66 determines that the HHP 20 is inside an image area.

When the plurality of nozzles 71 is located at the nozzle position C, all of the first to N-th nozzles of the plurality of nozzles 71 are outside the area 82. Accordingly, the position determination unit 66 determines that the HHP 20 is outside the image area. In the single pass mode, however, the coordinate in the Y-direction (i.e., height direction) is not seen. Accordingly, the position determination unit 66 determines that the HHP 20 is inside the image area.

When the plurality of nozzles 71 is located at the nozzle position D, the first nozzle of the plurality of nozzles 71 is outside the area 82 while the N-th nozzle is inside the area 82. Accordingly, the position determination unit 66 determines that the HHP 20 is inside the image area. However, when the position determination unit 66 uses the location of the first nozzle alone for determination, the position determination unit 66 determines that the HHP 20 is outside the image area. That is, the position determination unit 66 may determine whether a part of the HHP 20 serving as an image forming apparatus exceeds the right end or the left end of the image data.

Figure 19A:
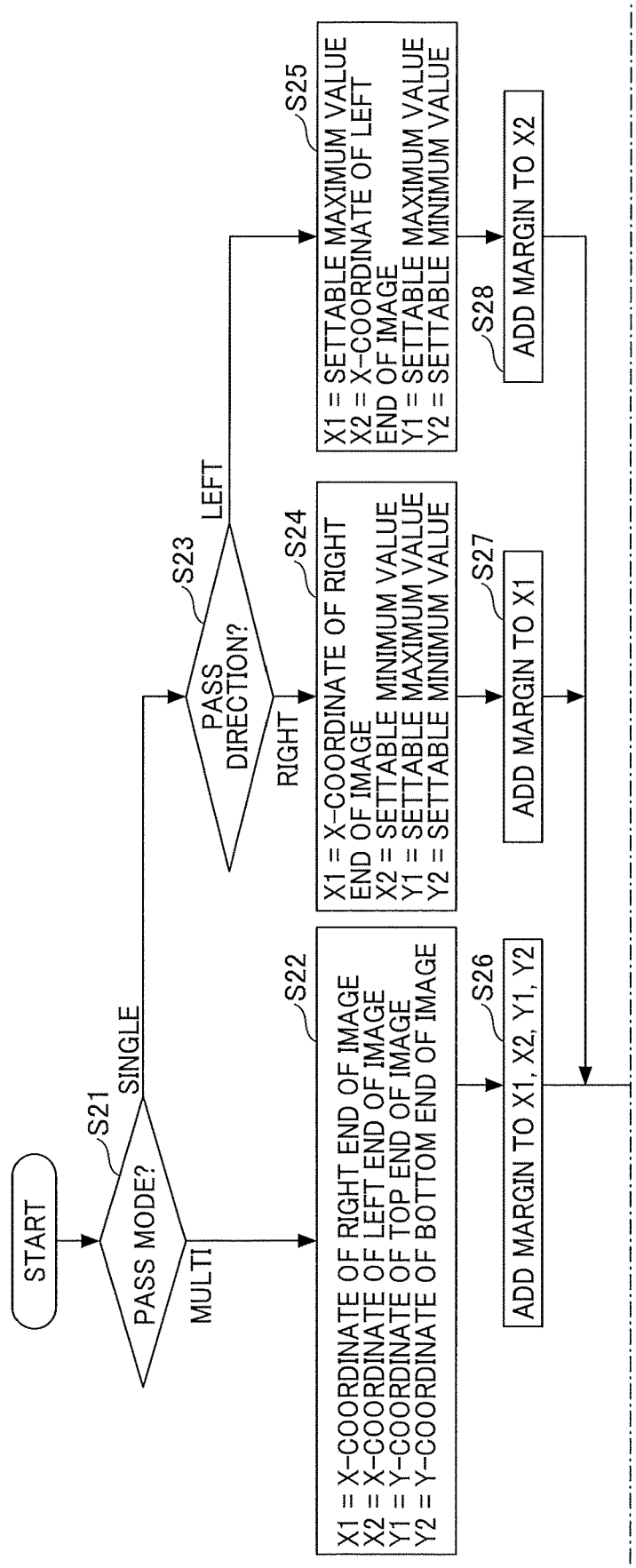
FIG. 19A is a flowchart illustrating a process performed by a position determination unit illustrated in FIG. 6, to determine whether the nozzle position is inside or outside the image area.
Figure 19B:
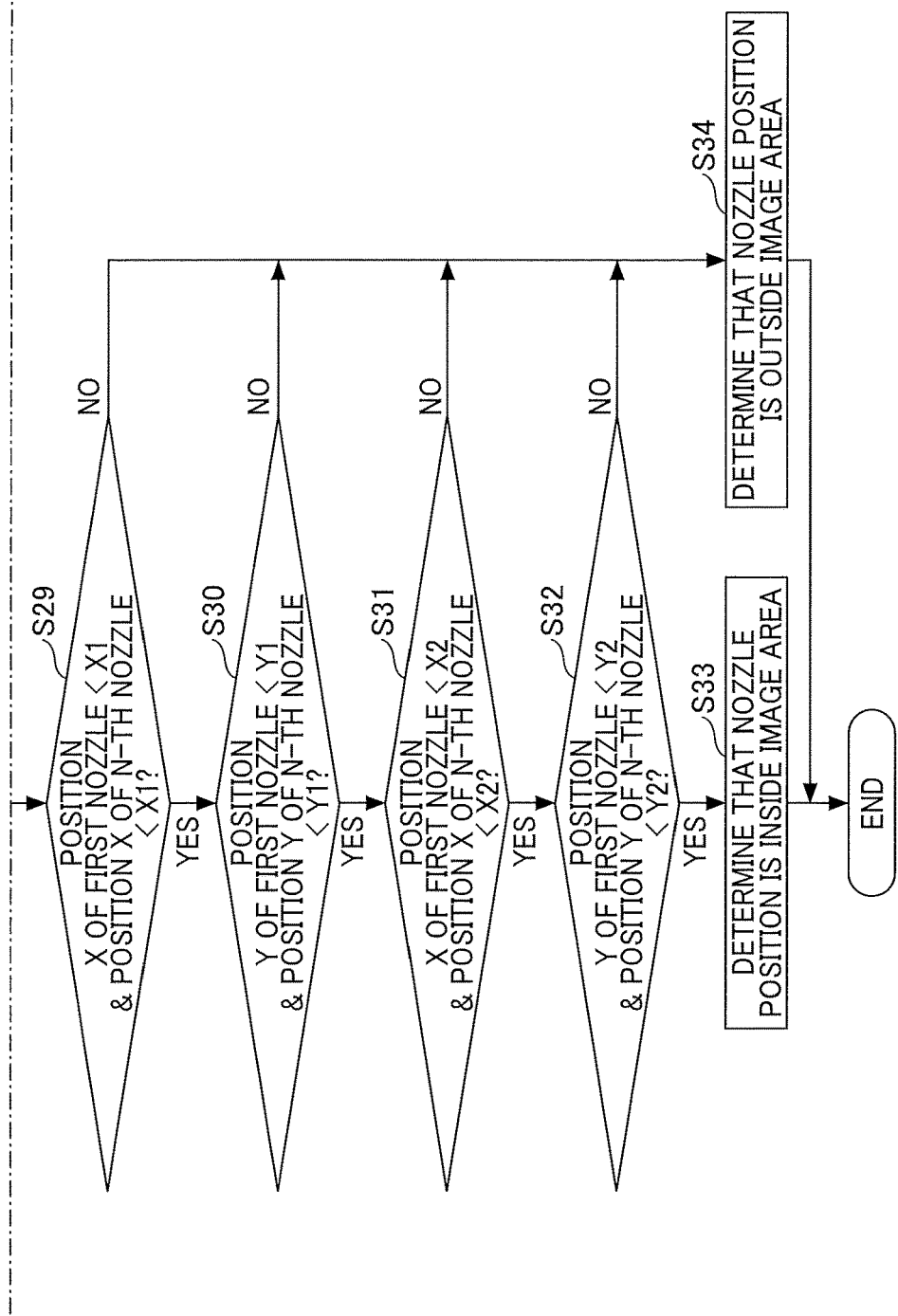
FIG. 19B is a continuation of the flowchart of the process illustrated in FIG. 19A.

FIG. 19A is a flowchart illustrating a process performed by the position determination unit 66 to determine whether the nozzle position is inside or outside the image area. FIG. 19B is a continuation of the flowchart of the process illustrated in FIG. 19A.

In step S21, the position determination unit 66 determines whether the pass mode is the single pass mode or the multi-pass mode because the determination on the nozzle position depends on the pass mode.

When the pass mode is the multi-pass mode (MULTI in step S21), the position determination unit 66 sets four determination thresholds as variables X1, X2, Y1, and Y2 as below X1=X-coordinate of right end of image
X2=X-coordinate of left end of image
Y1=Y-coordinate of top end of image
Y2=Y-coordinate of bottom end of image
in step S22.

As mentioned above, the values of X1, X2, Y1, and Y2 are detectable from the image data.

On the other hand, when the pass mode is the single pass mode (SINGLE in step S21), the position determination unit 66 further determines whether the pass direction is the right direction or the left direction in step S23.

When the pass direction is the right direction (RIGHT in step S23), the position determination unit 66 determines the right end alone within the image area. Accordingly, the position determination unit 66 sets four determination thresholds as variables X1, X2, Y1, and Y2 as below X1=X-coordinate of right end of image
X2=settable minimum value
Y1=settable maximum value
Y2=settable minimum value
in step S24.

The settable minimum value is a minimum value that can be treated as a numerical value by the HHP 20. Similarly, the settable maximum value is a maximum value that can be treated as a numerical value by the HHP 20. That is, the nozzle position is not smaller than the settable minimum value and not greater than the settable maximum value. As the variable X2 is the settable minimum value, the position determination unit 66 does not determine that the nozzle position is outside the image area when the HHP 20 is moved in the opposite direction (in this case, the left direction).

When the pass direction is the left direction (LEFT in step S23), the position determination unit 66 determines the left end alone within the image area. Accordingly, the position determination unit 66 sets four determination thresholds as variables X1, X2, Y1, and Y2 as below X1=settable maximum value
X2=X-coordinate of left end of image
Y1=settable maximum value
Y2=settable minimum value
in step S25.

Thus, the position determination unit 66 sets the variables X1, X2, Y1, and Y2 according to the pass mode, thereby performing the determination on the nozzle position as appropriate to the pass mode. As the variable X1 is the settable minimum value, the position determination unit 66 does not determine that the nozzle position is outside the image area when the HHP 20 is moved in the opposite direction (in this case, the right direction).

In steps S26 to S28, the position determination unit 66 sets the margin 81 around the image area 80.

In step S26, the margin 81 is set or added to each of X1, X2, Y1 and Y2 because the pass mode is the multi-pass mode.

In step S27, the margin 81 is set or added to X1 alone because the pass mode is the single pass mode and the pass direction is the right direction.

In step S28, the margin 81 is set or added to X2 alone because the pass mode is the single pass mode and the pass direction is the left direction.

In step S29, the position determination unit 66 determines whether a position X of the first nozzle is smaller than X1 (i.e., position X of first nozzle<X1) and a position X of the N-th nozzle is smaller than X1 (i.e., position X of N-th nozzle<X1). That is, the position determination unit 66 determines whether the first to N-th nozzles of the plurality of nozzles 71 do not exceed the right end of the image data. In other words, the position determination unit 66 determines whether the entire HHP 20 does not exceed the right end of the image data.

When the first to N-th nozzles of the plurality of nozzles 71 (i.e., HHP 20) do not exceed the right end of the image data (YES in step S29), the position determination unit 66 determines whether a position Y of the first nozzle is smaller than Y1 (i.e., position Y of first nozzle<Y1) and a position Y of the N-th nozzle is smaller than Y1 (i.e., position Y of N-th nozzle<Y1) in step S30. That is, the position determination unit 66 determines whether the first to N-th nozzles of the plurality of nozzles 71 do not exceed the top end of the image data. In other words, the position determination unit 66 determines whether the entire HHP 20 does not exceed the top end of the image data.

When the first to N-th nozzles of the plurality of nozzles 71 (i.e., HHP 20) do not exceed the top end of the image data (YES in step S30), the position determination unit 66 determines whether the position X of the first nozzle is smaller than X2 (i.e., position X of first nozzle<X2) and the position X of the N-th nozzle is smaller than X2 (i.e., position X of N-th nozzle<X2) in step S31. That is, the position determination unit 66 determines whether the first to N-th nozzles of the plurality of nozzles 71 do not exceed the left end of the image data. In other words, the position determination unit 66 determines whether the entire HHP 20 does not exceed the left end of the image data.

When the first to N-th nozzles of the plurality of nozzles 71 (i.e., HHP 20) do not exceed the left end of the image data (YES in step S31), the position determination unit 66 determines whether the position Y of the first nozzle is smaller than Y2 (i.e., position Y of first nozzle<Y2) and the position Y of the N-th nozzle is smaller than Y2 (i.e., position Y of N-th nozzle<Y2) in step S32. That is, the position determination unit 66 determines whether the first to N-th nozzles of the plurality of nozzles 71 do not exceed the bottom end of the image data. In other words, the position determination unit 66 determines whether the entire HHP 20 does not exceed the bottom end of the image data.

Note that, in steps S29 to S32, the positions X of both the first nozzle and the N-th nozzle are compared with the variables X1 and X2. However, in the single pass mode, a position of an end nozzle of the plurality of nozzles 71 (in this case, the position X of either the first nozzle or the N-th nozzle) may be compared with the variables X1 and X2. This is because, in the single pass mode, the positions of the first nozzle and the N-th nozzle have the identical values. That is, the position determination unit 66 may determine whether a part of the HHP 20 exceeds the right end or the left end of the image data.

When YES in all of steps S29 to S32, the position determination unit 66 determines that the nozzle position is inside the image area in step S33.

When NO in any one of steps S29 to S32, the position determination unit 66 determines that the nozzle position is outside the image area in step S34.

In the present example of FIG. 19 (FIGS. 19A and 19B), the position determination unit 66 determines whether the nozzle position is inside or outside the image area. Alternatively, the position determination unit 66 may determine whether the coordinates of any part of the main body (or housing) of the HHP 20 is inside or outside the image area. The coordinates of any part of the housing of the HHP 20 are determined relative to the nozzle position and therefore can be calculated from the nozzle position. Example parts of the housing include four corners of the bottom face or an outermost edge. That is, for example, the position determination unit 66 may determine whether the coordinates of any one of the four corners of the bottom face or the coordinates of the outermost edge is inside or outside the image area.

Figure 20:
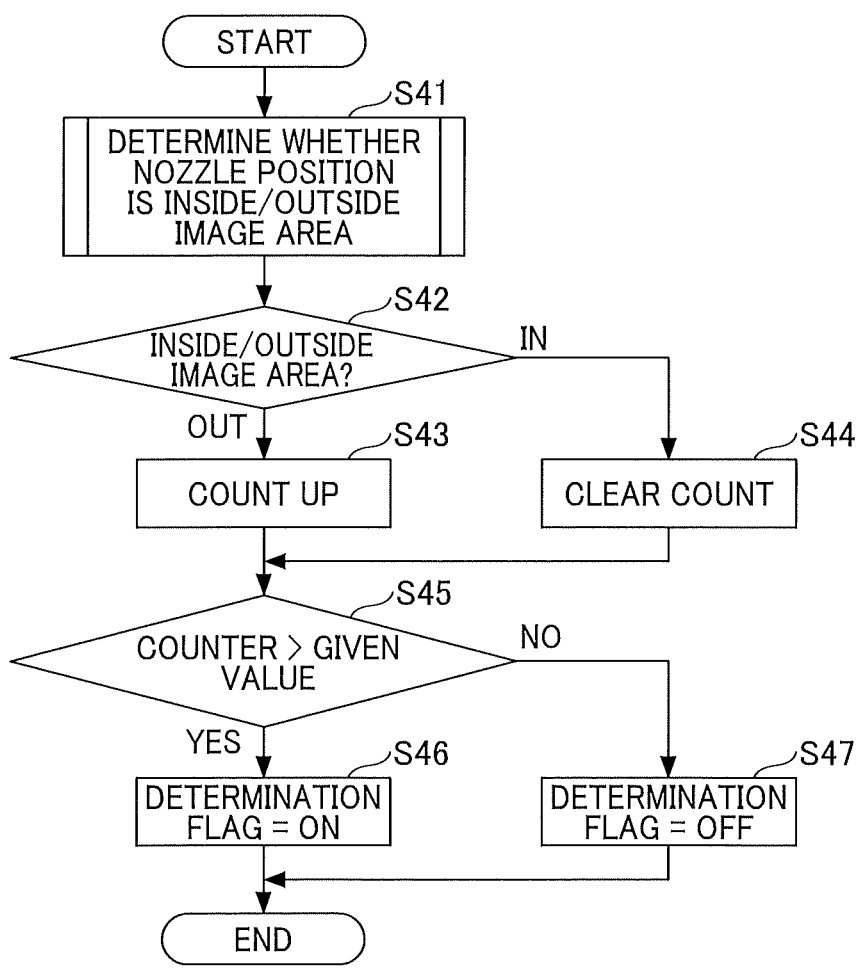
FIG. 20 is a flowchart illustrating a process performed by the position determination unit to determine whether to notify a state control unit illustrated in FIG. 6 of detection that the nozzle position is outside the image area, as a result of determination illustrated in FIGS. 19A and 19B.

FIG. 20 is a flowchart illustrating a process performed by the position determination unit 66 to determine whether to notify the state control unit 67 of detection that the nozzle position is outside the image area, as a result of determination illustrated in FIG. 19 (FIGS. 19A and 19B).

In step S41, the position determination unit 66 determines whether the nozzle position is inside or outside the image area as described above with reference to FIG. 19 (FIGS. 19A and 19B).

In step S42, the position determination unit 66 determines whether the determination result is that the nozzle position is inside the image area or that the nozzle position is outside the image area.

When the determination result is that the nozzle position is outside the image area (OUT in step S42), the position determination unit 66 counts up a measured time value in step S43.

On the other hand, when the determination result is that the nozzle position is inside the image area (IN in step S42), the position determination unit 66 clears the measured time value in step S44.

In step S45, the position determination unit 66 determines whether the measured time value is equal to or greater than a given value. When the measured time value is equal to or greater than the given value (YES in step S45), the position determination unit 66 sets on a determination flag in step S46. Then, the position determination unit 66 notifies the state control unit 67 of the detection that nozzle position is outside the image area.

On the other hand, when the measured time value is smaller than the given value (NO in step S45), the position determination unit 66 sets off the determination flag in step S47.

Note that the given value (i.e., given period of time) is adjustable as appropriate and settable by the user.

As described above, when determining that the nozzle position is outside the image area in the process illustrated in FIG. 19 (FIGS. 19A and 19B), the position determination unit 66 monitors, for the given period of time, the nozzle position outside the image area, thereby preventing a finish of printing when the user erroneously moves the HHP 20 out of the image area.

Figure 21:
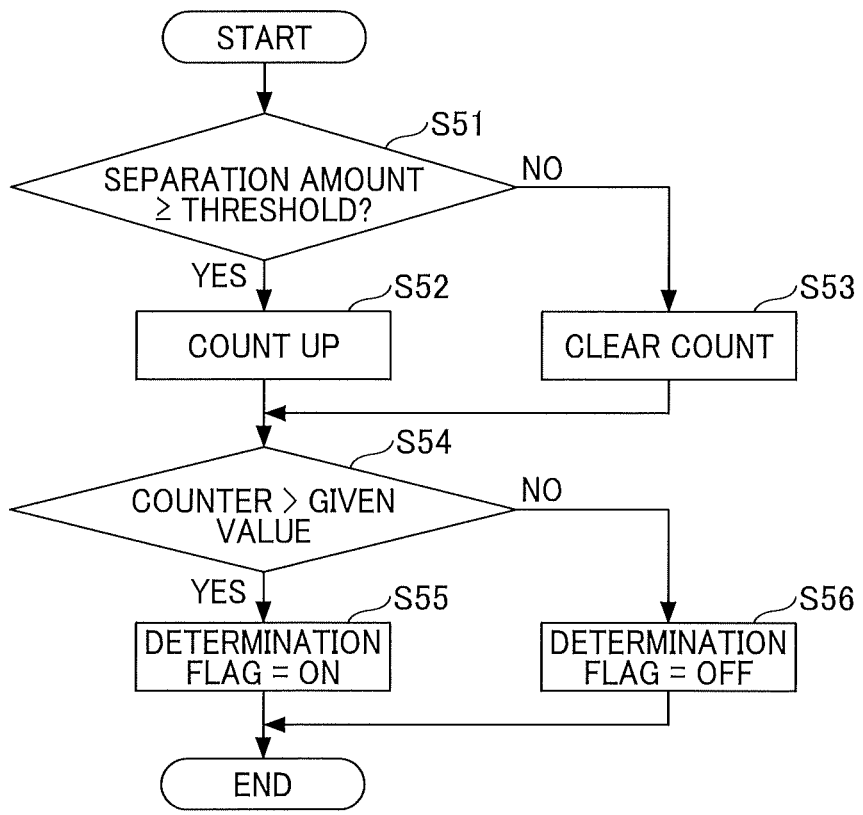
FIG. 21 is a flowchart illustrating a process performed by a separation determination unit illustrated in FIG. 6, to determine whether the separation of the handheld printer is detected.

Referring now to FIG. 21, a detailed description is given of step S3 illustrated in FIG. 16, that is, the determination on separation.

FIG. 21 is a flowchart illustrating a process performed by the separation determination unit 63 to determine whether the separation of the HHP 20 is detected.

In step S51, the separation determination unit 63 determines whether the separating amount acquired from the separation sensor 32 is equal to or greater than a threshold. For example, the separation determination unit 63 can ignore a slight separation when the separation sensor 32 detects that the HHP 20 is separated or not, together with the separating amount. When the separation sensor 32 simply detects that the HHP 20 is separated or not, without the separation amount, the separation determination unit 63 determines that the separating amount is equal to or greater than the threshold when the separation sensor 32 detects that the HHP 20 is separated from a print medium.

When the separating amount is equal to or greater than the threshold (YES in step S51), the separation determination unit 63 counts up a measured time value in step S52.

On the other hand, when the separating amount is smaller than the threshold (NO in step S51), the separation determination unit 63 clears the measured time value in step S53.

In step S54, the separation determination unit 63 determines whether the measured time value is equal to or greater than a given value. When the measured time value is equal to or greater than the given value (YES in step S54), the separation determination unit 63 sets on a determination flag in step S55. Then, the separation determination unit 63 notifies the state control unit 67 of the detection that the HHP 20 is separated.

On the other hand, when the measured time value is smaller than the given value (NO in step S54), the separation determination unit 63 sets off the determination flag in step S56.

Note that the threshold is adjustable as appropriate and settable by the user. The given value (i.e., given period of time) described above with reference to FIG. 21 may be identical to or different from the given value (i.e., given period of time) described above with reference to FIG. 20.

Figure 22:
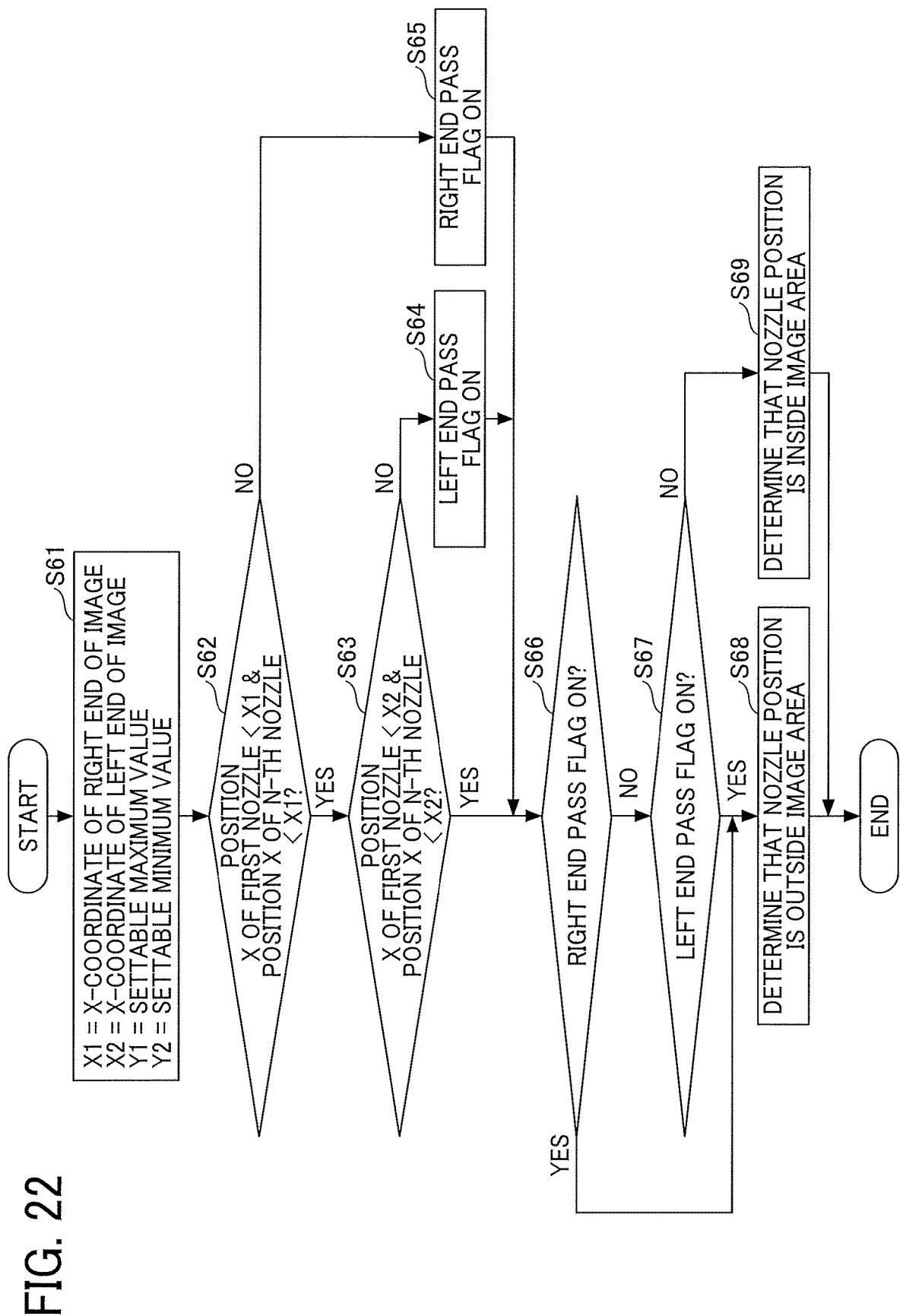
FIG. 22 is a flowchart illustrating a variation of the process illustrated in FIGS. 19A and 19B.

Referring now to FIG. 22, a description is given of a variation of the determination on the nozzle position described above with reference to FIG. 19 (FIGS. 19A and 19B).

In the single pass mode in FIG. 19 (FIGS. 19A and 19B), the position determination unit 66 determines whether the pass direction is the right direction or the left direction for the subsequent determining operations. Alternatively, however, such determination on the pass direction may be omitted. Note that a description is now given of a variation of the determination process in the single pass mode alone, as the determination process in the multi-pass mode is unchanged.

FIG. 22 is a flowchart illustrating a variation of the determination process illustrated in FIG. 19 (FIGS. 19A and 19B).

The position determination unit 66 sets four determination thresholds as variables X1, X2, Y1, and Y2 as below
X1=X-coordinate of right end of image
X2=X-coordinate of left end of image
Y1=settable maximum value
Y2=settable minimum value
in step S61.

In step S62, the position determination unit 66 determines whether the position X of the first nozzle is smaller than X1 (i.e., position X of first nozzle<X1) and the position X of the N-th nozzle is smaller than X1 (i.e., position X of N-th nozzle<X1). That is, the position determination unit 66 determines whether the first to N-th nozzles of the plurality of nozzles 71 do not exceed the right end of the image data.

When the first to N-th nozzles of the plurality of nozzles 71 do not exceed the right end of the image data (YES in step S62), the position determination unit 66 determines whether the position X of the first nozzle is smaller than X2 (i.e., position X of first nozzle<X2) and the position X of the N-th nozzle is smaller than X2 (i.e., position X of N-th nozzle<X2) in step S63. That is, the position determination unit 66 determines whether the first to N-th nozzles of the plurality of nozzles 71 do not exceed the left end of the image data.

On the other hand, when NO in step S62, the position determination unit 66 sets on a right end pass flag in step S65.

When the first to N-th nozzles of the plurality of nozzles 71 do not exceed the left end of the image data (YES in step S63), the process processed to step S66.

On the other hand, when NO in step S63, the position determination unit 66 sets on a left end pass flag in step S64.

When the right end pass flag is set on (YES in step S66), the position determination unit 66 determines that the nozzle position is outside an image area in step S68.

On the other hand, when the right end pass flag is set off (NO in step S66), and when the left end pass flag is set on (YES in step S67), the position determination unit 66 determines that the nozzle position is outside the image area in step S68.

When the right end pass flag is set off (NO in step S66), and when the left end pass flag is set off (NO in step S67), the position determination unit 66 determines that the nozzle position is inside the image area in step S69.

Thus, in the single pass mode, the position determination unit 66 may determine whether the nozzle position is inside or outside the image area without determining whether the pass direction is the right direction or the left direction. Similar to the determination process illustrated in FIG. 19 (FIGS. 19A and 19B), the position determination unit 66 may determine whether a part of the HHP 20 exceeds the right end or the left end of the image data in the single pass mode.

Now, a description is given of some advantages according to the embodiments of the present disclosure.

As described above, the HHP 20 changes the system state of the HHP 20 based on the state associated with the movement of the HHP 20 (e.g., detection of movement outside an image area or separation from a print medium). Completion of printing allows the user to start printing the next page, thereby reducing the frequency of user operations. Typically, in order to change the system state to "image formation complete", the user bothers to press a given button of a handheld printer, for example. According to the embodiments of the present disclosure, the user can forcibly complete printing of image data even while the printing is in progress, to print the next image data.

According to the embodiments of the present disclosure, an image forming apparatus reduces the frequency of user operations.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

For example, the HHP 20 described above has both the single pass mode and the multi-pass mode. Alternatively, the HHP 20 may have either the single pass mode or the multi-pass mode.

The HHP 20 may communicate with a server. In such a case, a user transmits image data to the server in advance and records the image data in association with, e.g., a user ID. When the HHP 20 transmits the user ID to the server (that is, when the user logs in), the server transmits the image data to the HHP 20. The HHP 20 then prints an image according to the image data.

The user may input text as a print target by voice. In such a case, the image data output device 11 may transmit voice data to the server. The server then performs a speech recognition process.

The HHP 20 may include a camera. In such a case, the HHP 20 can print an image captured by the camera.

In the embodiment described above, for example, FIG. 6 illustrates a configuration divided into functional blocks based on main functions of the image data output device 11 and the HHP 20 to facilitate understanding of the processes by the image data output device 11 and the HHP 20. The embodiments of the present disclosure are not limited by how the configuration is divided into functional or process units or by the unit name The configuration of the image data output device 11 and the HHP 20 can be divided into even more functional or process units depending on the processes. Relatedly, a single functional or process unit can be further divided into some functional or process units.

Note that the position calculation circuit 34 is an example of a position detector. The IJ recording head controller 44 is an example of a discharge driver. The state control unit 67 is an example of a state control unit. The position determination unit 66 is an example of an image area determination unit. The separation determination unit 63 is an example of a distance detector.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An image forming apparatus comprising:
an ink jet recording head configured to form an image on a medium; and circuitry configured to:
determine whether a position of the ink jet recording head is inside an image area or outside the image area, said image area is defined by an origin (0, 0), a maximum value Xanax of the X-coordinate of coordinates of image data of the image, and a maximum value Ymax of the Y-coordinate of the coordinates of the image data of the image;
measure a first period of time during which the position of the inkjet recording head is outside the image area:
detect a position of the inkjet recording head relative to the medium, said position including a distance between the medium and the inkjet recording head in a thickness direction of the medium;
measure a second period of time during which the distance is equal or more than a predetermined threshold value:
control the ink jet recording head based on the position of the inkjet recording head detected and image data; and
control a system state of the ink jet recording head based on the position of the ink jet recording head associated with movement of the ink jet recording head relative to the medium or a determination result as to whether the position of the inkjet recording head is inside the image area or outside the image area.

2. The image forming apparatus according to claim 1, wherein the circuitry is configured to control the system state based on the position of the ink jet recording head relative to an image area in which the ink jet recording head forms the image according to the image data.

3. The image forming apparatus according to claim 1, wherein the circuitry is configured to:
cause the ink jet recording head to form the image when the system state indicates a moving state in which the ink jet recording head is moving; and
control the system state, based on the position of the ink jet recording head, from the moving state to an image formation completion state in which formation of the image is complete.

4. The image forming apparatus according to claim 3, wherein the circuitry is configured to control the system state from the moving state to the image formation completion state even when the formation of the image according to the image data is incomplete.

5. The image forming apparatus according to claim 4, wherein the circuitry is configured to:

change the system state from the image formation completion state to a print ready state in which the circuitry receives a start of the formation of the image, in response to other image data remaining unused for the formation of the image after the circuitry controls the system state from the moving state to the image formation completion state; and change the system state from the print ready state to the moving state in response to a given operation under the print ready state.

6. The image forming apparatus according to claim 1, wherein the circuitry is configured to maintain the system state regardless of the position of the ink jet recording head relative to an image area in which the ink jet recording head forms the image according to the image data, when the ink jet recording head forms the image in a bi-directional pass mode in which a user moves the ink jet recording head left to right and right to left.

7. The image forming apparatus according to claim 1, wherein the circuitry is configured to control the system state in response to the position of the ink jet recording head exceeding a right end of an image area in which the ink jet recording head forms the image according to the image data, when the ink jet recording head forms the image in a unidirectional pass mode in which a user moves the ink jet recording head left to right.

8. The image forming apparatus according to claim 1, wherein the circuitry is configured to control the system state in response to the position of the ink jet recording head exceeding a left end of an image area in which the ink jet recording head forms the image according to the image data, when the ink jet recording head forms the image in a unidirectional pass mode in which a user moves the ink jet recording head right to left.

9. The image forming apparatus according to claim 1, wherein the circuitry is configured to control the system state in response to an entire of the ink jet recording head exceeding one of a right end, a left end, a top end, and a bottom end of an image area in which the ink jet recording head forms the image according to the image data, when the ink jet recording head forms the image in a bi-directional pass mode in which a user moves the ink jet recording head left to right and right to left.

10. The image forming apparatus according to claim 1, wherein the circuitry is configured to control the system state in response to a part of the ink jet recording head exceeding a right end of an image area in which the ink jet recording head forms the image according to the image data, when the ink jet recording head forms the image in a unidirectional pass mode in which a user, moves the ink jet recording head left to right.

11. The image forming apparatus according to claim 1, wherein the circuitry is configured to control the system state in response to a part of the ink jet recording head exceeding a left end of an image area in which the ink jet recording head forms the image according to the image data, when the ink jet recording head forms the image in a unidirectional pass mode in which a user moves the ink jet recording head right to left.

12. The image forming apparatus according to claim 1, wherein the circuitry is configured to control the system state in response to a part of the ink jet recording head exceeding one of a right end and a left end of an image area, in which the ink jet recording head forms the image according to the image data, when the ink jet recording head forms the image in a unidirectional pass mode in which a user moves the ink jet recording head left to right or right to left.

13. A state control method comprising:
determining whether a position of the ink jet recording head is inside an image area or outside the image area, said image area is defined by an origin (0, 0), a maximum value Xmax of the X-coordinate of coordinates of image data of the image, and a maximum value Ymax of the Y-coordinate of the coordinates of the image data of the image;

measuring a first period of time during which the position of the ink jet recording head is outside the image area:

detecting a position of an inkjet recording head relative to a medium on which the ink jet recording head forms an image, said position including a distance between the medium and the ink jet recording head in a thickness direction of the medium;

measure a second period of time during which the distance is equal or more than a predetermined threshold value;

controlling the ink jet recording head based on the position of the ink jet recording head detected and image data; and controlling a system state of the inkjet recording head based on the position of the ink jet recording head associated with movement of the ink jet recording head relative to the medium or a determination result as to whether the position of the ink jet recording head is inside the image area or outside the image area.

14. A non-transitory, computer-readable storage medium storing computer-readable program code that causes a computer to perform a state control method, the state control method comprising:

determining whether a position of an inkjet recording head is inside an image area or outside the image area, said image area is defined by the origin (0,0), a maximum value Xmax of the X-coordinate of coordinates of image data of the image, and a maximum value Ymax of the Y-coordinate of the coordinates of the image data of the image;

measuring a first period of time during which the position of the ink jet recording head is outside the image area:

detecting a position of an inkjet recording head relative to a medium on which the ink jet recording head forms an image, said position including a distance between the medium and the ink jet recording head in a thickness direction of the medium;

measure a second period of time during which the distance is equal or more than a predetermined threshold value;

controlling the inkjet recording head based on the position of the ink jet recording head detected and image data; and controlling a system state of the inkjet recording head based on the position of the ink jet recording head associated with movement of the ink jet recording head relative to the medium or a determination result as to whether the position of the ink jet recording head is inside the image area or outside the image area.

15. The image forming apparatus according to claim 6, wherein the circuitry is configured to detect the distance by controlling a separation sensor configured to detect the distance between the medium and the ink jet recording head in a thickness direction of the medium.

16. The image forming apparatus according to claim 1, wherein an separation sensor is one of a mechanical switch that is configured to be turned on by weight of the ink jet recording head when the ink jet recording head is in contact with the medium and a distance measuring sensor.

17. The image forming apparatus according to claim 3, wherein the circuitry is configured to:
   determine whether the image forming apparatus is in a single path mode or a multi-path mode, and
   detect the position of the ink jet recording head upon determining that the position of the ink jet recording head is inside the image area or determining that the image forming apparatus is in the multi-path, mode.

18. The image forming apparatus according to claim 3, wherein the circuitry is configured to:
   control the system state from the moving state to the image formation completion state upon determining that the position of the ink jet recording head is outside the image area or detecting that the position of the ink jet recording head relative to the medium exceeds a threshold value.

19. The image forming apparatus according to claim 6, wherein the circuitry is configured control the system state of the ink jet recording head upon detecting that the first period of time exceeds a first predetermined time period or detecting that the second period of time exceeds a second predetermined time period.

* * * * *